United States Patent [19]

Nakayama

[11] Patent Number: 5,317,504
[45] Date of Patent: May 31, 1994

[54] COMPUTER IMPLEMENTED PROCESS FOR EXECUTING ACCOUNTING THEORY SYSTEMS

[75] Inventor: Mamoru Nakayama, Tokyo, Japan
[73] Assignee: T.A.S. & Trading Co., Ltd., Japan
[21] Appl. No.: 958,181
[22] Filed: Oct. 8, 1992
[30] Foreign Application Priority Data Oct. 23, 1991 [JP] Japan ................................. 3-302752

[51] Int. Cl.⁵ .............................................. G06F 15/00
[52] U.S. Cl. .................................. 364/406; 395/922; 395/925
[58] Field of Search .................. 364/406; 395/922, 925

[56] References Cited

U.S. PATENT DOCUMENTS 4,841,441  6/1989  Nixon et al. ......................... 364/401
5,084,813  1/1992  Ono ......................................... 395/1

Primary Examiner—Roy N. Envall
Assistant Examiner—Gita Shingala
Attorney, Agent, or Firm—Lorusso & Loud

[57] ABSTRACT

Method for creating programs and processing data by having data in the form of data cards readily moved in and out of, and exchanged between, a command module, automatic editing display generator, printer generator and database. Programs may be written by simply selecting necessary commands in a small number of characters. The commands may be selected illustratively through kana-kanji conversion input. There is no need to type long sentences in alphabetic characters or in symbols. On arrival at the database, the data card containing actual data is controlled solely by the data characteristics of the database for file storage and editing, free of the constraints of any other module. A group of files on a magnetic disk where data layouts are defined may be readily accessed by anyone with little knowledge of computer systems by use of an appropriate series of database commands. Furthermore, the data cards containing actual data may be processed individually and parallelly by each of the modules. The inventive method allows anyone with little knowledge of computer systems easily to create and execute one program after another as needed. Because the commands function in the order they are arranged, the complexity associated with conventional loop control arrangements is significantly alleviated.

4 Claims, 30 Drawing Sheets

FIG. 3

MANUALLY WRITTEN JOURNAL

JOURNAL DAY BOOK

| DATE | SLIP NO. | DIVISION CODE | DEBIT ITEM | BREAKDOWN | CREDIT ITEM | BREAKDOWN | AMOUNT | REMARKS |
|---|---|---|---|---|---|---|---|---|
| 9/6 | 00001 | 00000001 | TRAVELING EXPENSES AND CARFARE | 0001 | CASH | | 12,000 | COMMUTER TICKET |
| | | | ......... | | | | | |

FIG. 6

APPLICATION PROGRAM LIST

| 1001 | BALANCE SHEET (B/S) PROGRAM | FUNCTION | PURPOSE | OBJECT | a |
|---|---|---|---|---|---|
| 1010 | PROFIT AND LOSS STATEMENT (P/L) PROGRAM | | | | b |
| 1011 | BUDGET VERSUS ACTUAL EXPENDITURE LIST PROGRAM | | | | c |
| 1100 | TRIAL BALANCE OF ACCOUNT BALANCES PROGRAM | | | | d |
| 1101 | TRIAL BALANCE OF BRANCH NUMBER BALANCES PROGRAM | | | | e |
| 1110 | FIRM BANKING PROGRAM | | | | f |
| 1111 | NOTES PAYABLE ISSUE CONTROL SYSTEM | | | | g |
| 0001 | CASH AND DEPOSIT CONTROL SYSTEM | | | | h |
| 0010 | FUND MANAGEMENT SYSTEM | | | | i |
| 0011 | FINANCIAL STATEMENT PREPARATION PROGRAM | | | | j |
| 0100 | ... | | | | k |
| | ... | | | | |

FIG. 9

AAA

51

| NO. | ITEM NAME | POSITION | SIZE | DIGIT COUNT | CHARACTER TYPE | DATA TYPE | REMARKS |
|---|---|---|---|---|---|---|---|
| 1 | MODULE NAME | 0 | 16 | 16 | ALPHANUMERIC /KANA | CHARACTER | |
| 2 | MODULE VERSION | 16 | 2 | 4 | INTEGER (+) | NUMERIC | |
| 3 | CALL JOB NO. | 18 | 2 | 4 | INTEGER (+) | NUMERIC | |
| 4 | RECORD TYPE | 20 | 2 | 2 | INTEGER (+) | NUMERIC | |
| 5 | ID NO. | 22 | 2 | 4 | INTEGER (+) | NUMERIC | |
| 6 | INPUT ENABLE SIGN | 24 | 1 | 1 | INTEGER (+) | CHARACTER | 1 (ENABLED) |
| 7 | INPUT SIGN | 25 | 1 | 1 | INTEGER (+) | CHARACTER | 0 (DISABLED) |
| 8 | SUB-MODULE 1 | 26 | 16 | 16 | ALPHANUMERIC /KANA | CHARACTER | NAME |
| 9 | SUB-MODULE 2 | 42 | 16 | 16 | ALPHANUMERIC /KANA | CHARACTER | NAME |
| 10 | DUMMY | 58 | 6 | 6 | ALPHANUMERIC /KANA | CHARACTER | |
| | | | | | | | |

FIG. 10 xxx

/52

| NO. | ITEM NAME | POSITION | SIZE | DIGIT COUNT | CHARACTER TYPE | DATA TYPE | REMARKS |
|---|---|---|---|---|---|---|---|
| 1 | RECORD LENGTH | 0 | 4 | 10 | INTEGER (+) | NUMERIC | |
| 2 | RECORD COUNT | 4 | 2 | 4 | INTEGER (+) | NUMERIC | 1024 |
| 3 | ACTUAL RECORD COUNT | 6 | 2 | 4 | INTEGER (+) | NUMERIC | |
| 4 | STARTING ITEM INFORMATION POSITION | 8 | 4 | 10 | INTEGER (+) | NUMERIC | |
| 5 | STARTING DATA POSITION | 12 | 4 | 10 | INTEGER (+) | NUMERIC | |
| 6 | INPUT ENABLE SIGN | 16 | 1 | 1 | INTEGER (+) | CHARACTER | 1 (ENABLED) |
| 7 | INPUT SIGN | 17 | 1 | 1 | INTEGER (+) | CHARACTER | 0 (DISABLED) |
| 8 | INTRA-RECORD ITEM COUNT | 18 | 1 | 3 | INTEGER (+) | CHARACTER | 128 |
| 9 | DUMMY | 19 | 13 | 13 | ALPHANUMERIC /KANA | CHARACTER | |

FIG.11

ZZZ ~53

| NO. | ITEM NAME | POSITION | SIZE | DIGIT COUNT | CHARACTER TYPE | DATA TYPE | REMARKS |
|---|---|---|---|---|---|---|---|
| 1 | RECORD NO. | 0 | 2 | 2 | INTEGER (+) | NUMERIC | |
| 2 | INTRA-RECORD SQE | 2 | 2 | 2 | INTEGER (+) | NUMERIC | |
| 3 | DATA MANAGEMENT INFORMATION | 4 | 36 | 36 | ALPHANUMERIC/KANA | CHARACTER | |
| 4 | ITEM SIZE | 40 | 4 | 5 | INTEGER (+) | NUMERIC | |
| 5 | ITEM TYPE | 44 | 2 | 4 | HEXADECIMAL | NUMERIC | |
| 6 | ITEM DIGIT COUNT 1 | 46 | 2 | 4 | INTEGER (+) | NUMERIC | INTEGER PART |
| 7 | ITEM DIGIT COUNT 2 | 48 | 2 | 4 | INTEGER (+) | NUMERIC | DECIMAL PART |
| 8 | SIGNIFICANT DIGIT COUNT | 50 | 2 | 4 | INTEGER (+) | NUMERIC | |
| 9 | ACTUAL DATA POSITION | 52 | 2 | 5 | INTEGER (+) | NUMERIC | |
| 10 | ITEM NAME | 54 | 20 | 10 | KANJI | CHARACTER | |
| 11 | INPUT ENABLE SIGN | 74 | 1 | 1 | INTEGER (+) | CHARACTER | 1 (ENABLED) |
| 12 | INPUT SIGN | 75 | 1 | 1 | INTEGER (+) | CHARACTER | 0 (DISABLED) |
| 13 | DUMMY | 76 | 4 | 4 | ALPHANUMERIC/KANA | CHARACTER | |

FIG.12

| TYPE | SYMBOL | CODE |
|---|---|---|
| DEPOSIT SLIP | Aij | 0 0 0 1 |
| PAYMENT SLIP | Bij | 0 0 1 0 |
| SALES SLIP | Cij | 0 0 1 1 |
| PURCHASE SLIP | Dij | 0 1 0 0 |
| . | | |
| . | | |
| . | | |
| MISCELLANEOUS SLIP | Kij | 1 0 1 1 |

| "ij" | ATTRIBUTE |
|---|---|
| i1 | DATE |
| i2 | CODE |
| i3 | AMOUNT |
| . | |
| . | |
| . | |
| . | |
| . | |
| in | MISCELLANEOUS ATTRIBUTE |

FIG. 13

| Aij | ITEM | BYTE LENGTH | BYTE POSITION | SIGNAL TYPE | NUMERIC/CHARACTER DISTINCTION | ACTUAL DATA |
|---|---|---|---|---|---|---|
| A11 | DATE | 4 | 0~3 | HEX | 1 | 910511 |
| A12 | CODE | 4 | 4~7 | HEX | 0 | CONSTANT |
| A13 | AMOUNT | 7 | 8~14 | HEK | 1 | 3,500 |
| • | | | | | | |
| • | | | | | | |
| • | | | | | | |
| A1n | | | | | | |

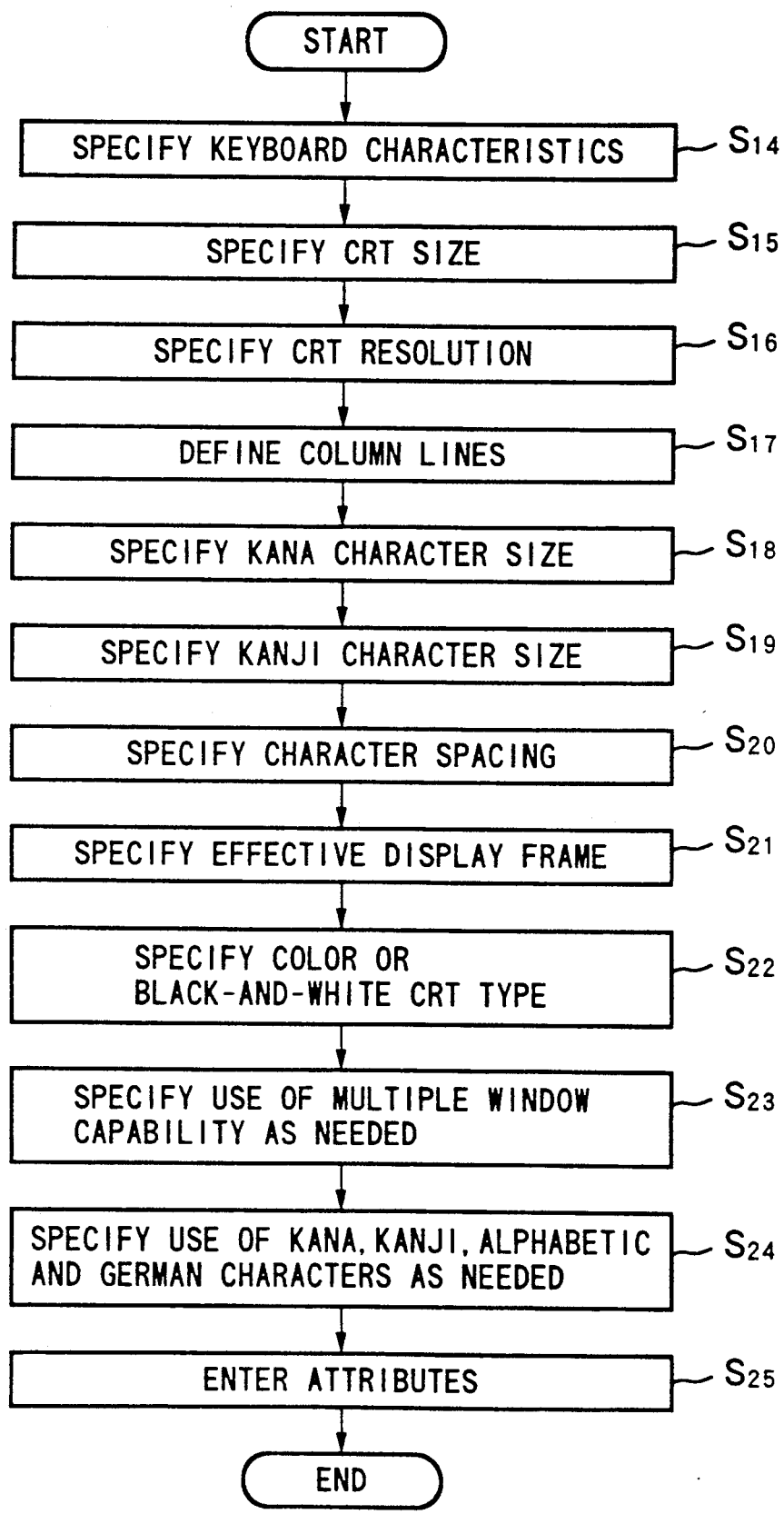

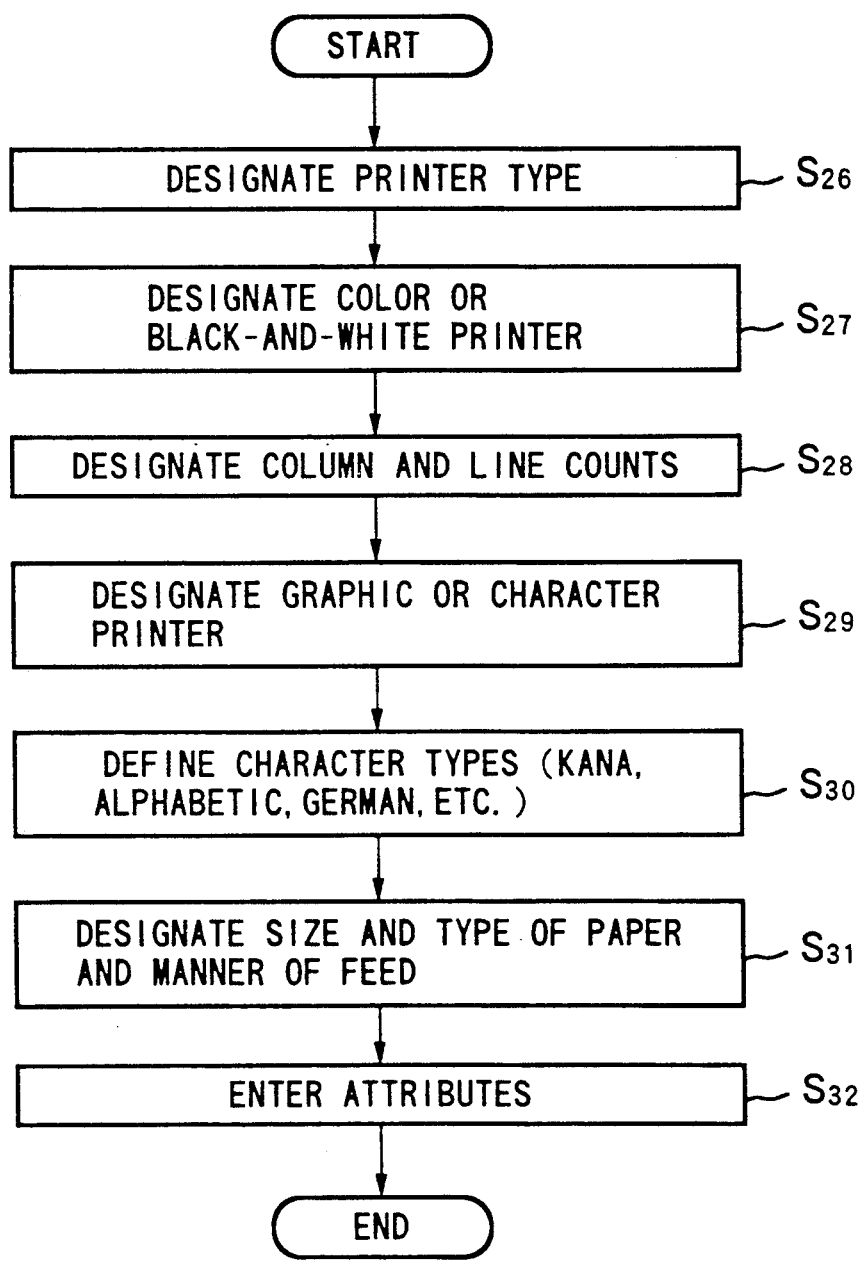

FIG. 22

BUDGET VERSUS ACTUAL EXPENDITURE LIST

| ACCOUNT NAME | THIS MONTH | | | | TOTAL | | | | ANNUAL BUDGET | REMAINING BUDGET | PERCENTAGE ACHIEVED |
|---|---|---|---|---|---|---|---|---|---|---|---|
| | BUDGET | ACTUAL EXPENDITURE | DIFFERENCE | % | BUDGET | ACTUAL EXPENDITURE | DIFFERENCE | % | | | |
| | | | | | | | | | | | |
| | | | | | | | | | | | |
| | | | | | | | | | | | |
| | | | | | | | | | | | |

FIG.29

ITEM DICTIONARY

| NO. | ITEM NO. | ACRONYM | ITEM NAME | CHARACTER TYPE | DIGIT COUNT |
|---|---|---|---|---|---|
| 0001 | 0001 | MEC | MAXIMUM ENTRY COUNT 2 | INTEGER(±) | 5 |
| 0002 | 0002 | MEC | MAXIMUM ENTRY COUNT 4 | INTEGER(±) | 9 |
| 0003 | 0003 | CEC | CURRENT ENTRY COUNT 2 | INTEGER(±) | 5 |
| 0004 | 0004 | CEC | CURRENT ENTRY COUNT 4 | INTEGER(±) | 9 |
| 0005 | 0101 | DT | DATE | PACK | 4 |
| 0006 | 0102 | UN | UNIT NUMBER | INTEGER(±) | 5 |
| 0007 | 0103 | SN | SEQUENCE NUMBER | INTEGER(±) | 5 |
| 0008 | 0104 | DC | DIVISION CODE | PACK | 3 |
| 0009 | 0105 | DA | DEBIT ACCOUNT | HEXADECIMAL | 4 |
| 0010 | 0106 | DA | DEBIT ACCOUNT | PACK | 4 |
| 0011 | 0107 | CA | CREDIT ACCOUNT | HEXADECIMAL | 4 |
| 0012 | 0108 | CA | CREDIT ACCOUNT | PACK | 4 |
| 0013 | 0109 | IG | IDENTIFICATION GRAPH | HEXADECIMAL | 2 |
| 0014 | 0110 | AT | AMOUNT | INTEGER(±) | 11 |
| 0015 | 0111 | RM | REMARKS | KANJI | 19 |

COMPUTER IMPLEMENTED PROCESS FOR EXECUTING ACCOUNTING THEORY SYSTEMS

BACKGROUND OF THE INVENTION

1. Field of the Invention

The present invention relates to a method for creating programs and processing data and, more particularly, to a method for creating accounting programs and processing accounting data,

2. Description of the Prior Art

Recent years have seen a growing number of fields where applied uses of artificial intelligence (AT), known as expert systems, allow lay personnel to address specialist tasks with a minimum of specialized background knowledge. The expert system combines specialized knowledge of a given field with computer system knowledge. On the one hand, there already exist a number of fairly complete expert systems implemented as expert programs for dealing with jobs in certain fields. On the other hand, specialists in yet-to-be addressed fields have abundant specialized knowledge but often find themselves almost illiterate in terms of computer programming. As an example of the latter case, accountants who wish to create anew their own accounting programs have conventionally had little choice but to rely on outside computer specialists or on in-house system developers.

Up till now, such expert programs have been most often created by specialized program developers under the constraints of their ability and responsibility. An accounting specialist, for example, who wants to be the end user of a new accounting program might conceivably be able to develop one but only after investing a tremendous amount of time and labor. The attempts most often turn out to be impossible, or almost.

Some expert systems are written in programming languages that are easier to use than such high-level languages as COBOL or C. The supposedly easy-to-use programming languages still require creating specific input screens through which to save, output and process data. The ease of use of such languages is adversely offset by the need to handle data in the rigidly specific manner. For all the ease it is supposed to offer, this group of expert systems ends up requiring a fair amount of computer programming knowledge.

Such difficulties notwithstanding, there is an ever-growing need in the field for an increasing number of new programs capable of executing more jobs. To address the need to create such programs individually in the conventional manner would mean expending a far more amount of time and cost than is practical. Today, a growing number of jobs are being hampered from efficient treatment by expert systems that are technically available but not economically.

SUMMARY OF THE INVENTION

It is therefore an object of the present invention to overcome the above-described drawbacks and disadvantages and to provide a method for easily programing processing programs whereby the general accounting personnel with no specialized knowledge about computers or system development may readily create one program after another that will become necessary to process their jobs.

In carrying out the invention and according to one aspect thereof, there is provided a method for creating programs and processing data comprising the following steps. First, a processing language for programming is established on the basis of accounting theory. An accounting knowledge for the accounting processing according to the theory is divided and classified by function so that the basic components of the accounting knowledge will be created. In preparation for generating a processing program, individual programming terms for programming are replaced by the basic components of the accounting knowledge.

Then appropriate programming terms and unit programs are selected to combine with actual data. These programming terms and the data are defined as execution information. A set of data cards is created which combines the attribute definitions of the actual data with the data themselves. Tn preparing a program, four distinct program modules are defined and used: a command module, a display (CRT) module, a print (PRT) module and a database module. The command module is assigned a set of commands by which users wish to obtain necessary information. The display module and the print modules are assigned those parts of information which are offered visibly to users. The database module is assigned those parts of information which are saved so that users may create or access necessary information thereby. All defined procedures and items are recorded in reusable format.

According to another Aspect of the invention, there is provided a method for creating programs and processing data comprising the following steps. First, various master files and slips presumed necessary for accounting purposes are listed. Items indicating the contents of these master files and slips are then established. An item dictionary is created to represent the attributes of these items. A list is created to include the hardware resources of data processing equipment as well as the firmware resources for use therewith, the latter resources being defined by the number, scope, functions and specifications of accounting application programs or the like. These lists are entered into magnetic storage to build a database comprising the master files, slips and various resources. Actual data are then written to the master files and slips. The master files and slips containing the actual data are combined with appropriate accounting application programs according to the accepted accounting rules. The combination yields groups of data that are significant in terms of accounting. These significant data groups are displayed on a display unit, printed on a printer, and/or stored in the magnetic storage.

These features of the invention allow accounting personnel—specialists in accounting but with a bare minimum knowledge about computer technology and system development—to create easily on their own one program after another that will become necessary to execute their accounting jobs.

According to the invention, instead of having to describe computer processing, accounting personnel simply describe accounting processes in order to write their own programs. This means enhancing the independence of programming terminology and data.

When users produce modules or programs as per the invention, the products are based on the users' own information. While independent of one another, these modules or programs have functions equivalent to those of programming languages (COBOL, C, etc.). By simply placing the information they have into such modules, users may create their own program.

Because programs are made of independently created modules each, the relationship between data and programs is kept uniform. This ensures the ease of creating programs.

With the ease of program creation guaranteed when each program is made of independently prepared modules, actual programs needed by users operate by combining the processes of the component modules and by computing saved data for output. Each program module need only process the data it receives without becoming aware of the contents of processes performed by the other modules.

Further objects, features and advantages of the invention will become more apparent upon a reading of the following description and appended drawings.

BRIEF DESCRIPTION OF THE DRAWINGS

FIG. 3 is a view showing a slip according to the invention;

FIG. 6 is a view portraying an application program list according to the invention;

FIG. 9 is a view depicting a header file structure according to the invention;

FIG. 10 is a view showing a record file structure according to the invention;

FIG. 11 is a view describing an item file structure according to the invention;

FIG. 12 is a view indicating part of an item dictionary according to the invention;

FIG. 13 is a view presenting a key portion of the item dictionary;

FIG. 15 is a flowchart of steps in which to enter CRT attributes according to the invention;

FIG. 16 is a flowchart of steps in which to enter printer attributes according to the invention;

FIG. 22 is a view showing a typical process to be carried out according to the invention;

FIG. 29 is a view describing another item dictionary according to the invention.

DESCRIPTION OF THE PREFERRED EMBODIMENT

One preferred embodiment of the invention will now be described with reference to the accompanying drawings.

Figure 1:
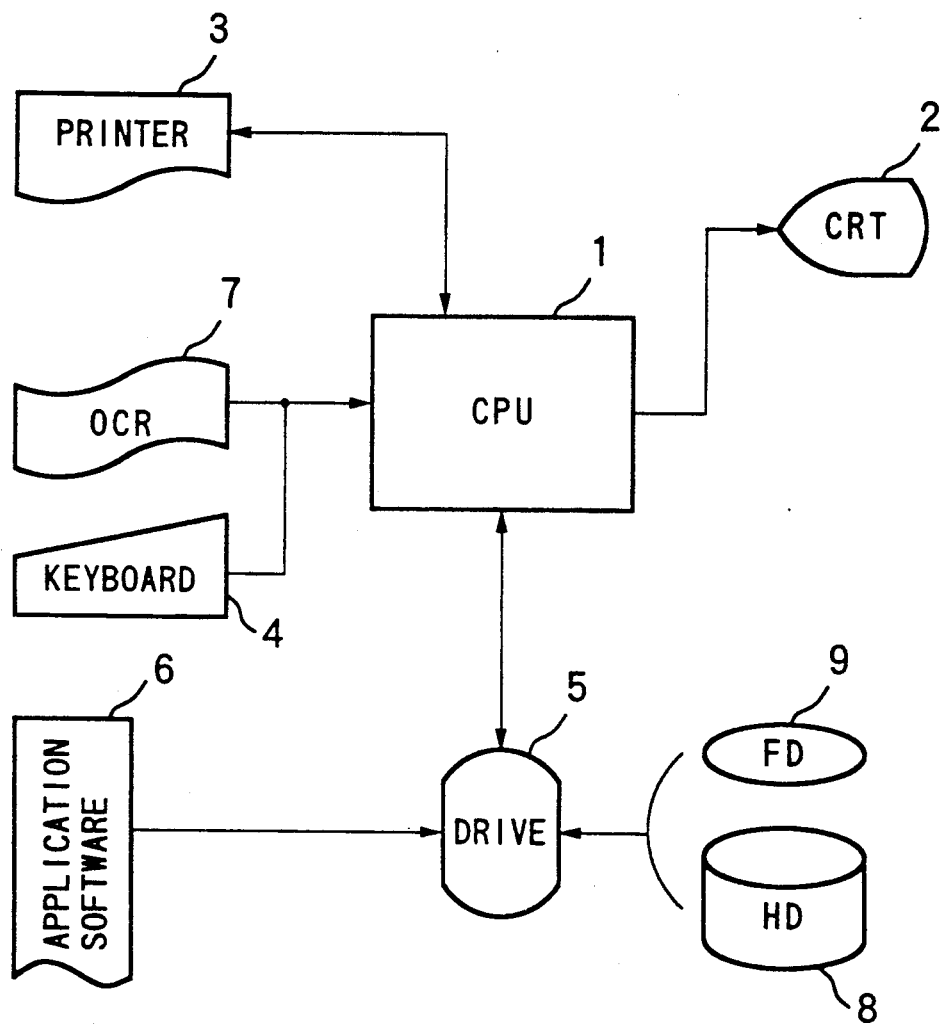
FIG. 1 is a block diagram of a data processor to which the invention is illustratively applied.

FIG. 1 is an overall block diagram of hardware constituting a data processor to which the invention is illustratively applied. As depicted, a central processing unit (CPU) 1 is connected to a display unit (CRT) 2, a printer 3, a keyboard 4, a disk drive 5 and an input unit (OCR) 7 operating on photoelectric conversion principles. The disk drive 5 drives a hard disk 8 or a floppy disk 9. The hard disk 8 contains various actual data constituting a database. Into the CPU 1 of the data processor, such basic programs 6 as accounting application programs, a word processing program, an accounting processing program and a statistical processing program are loaded in firmware format through the floppy disk 9 or the like. The components of the data processor including the basic programs 6 constitute "onerous" resources of the invention. These resources will simply be called resources hereunder.

Figure 2:
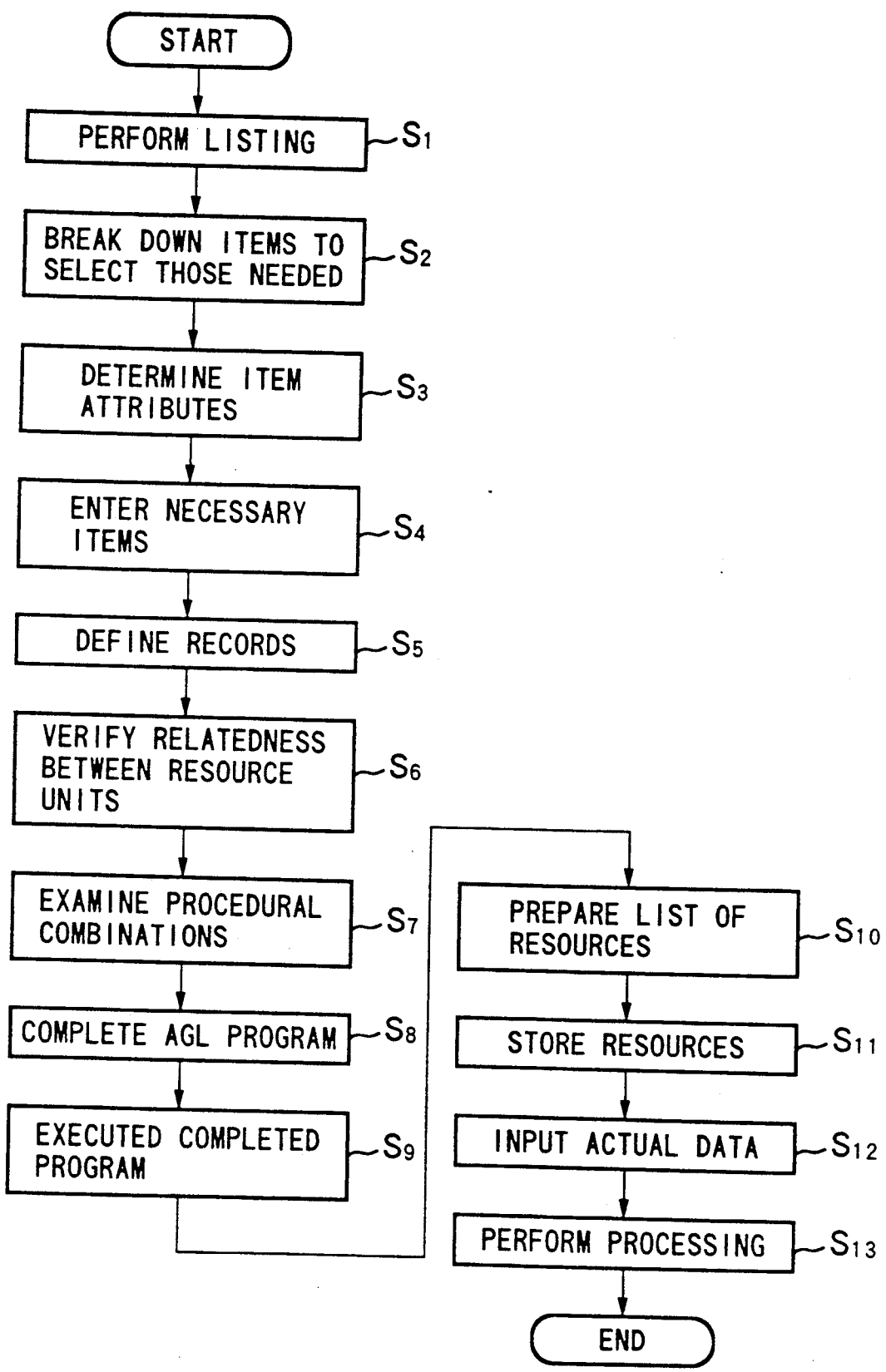
FIG. 2 is a flowchart showing major steps to be carried out according to the invention.

This embodiment of the invention will be described with the emphasis on how to process accounting data. FIG. 2 is a flowchart showing major steps to be carried out according to the invention. The main flowchart of FIG. 2 will be explained first so as to describe the overall operating procedure of the invention, followed by more detailed descriptions of subordinate flowcharts separately provided. Step S1 involves listing as many kinds of slips (FIG. 3) and master files (FIG. 4) as currently used by, say, a distributor or other business establishment in question.

Figure 5:
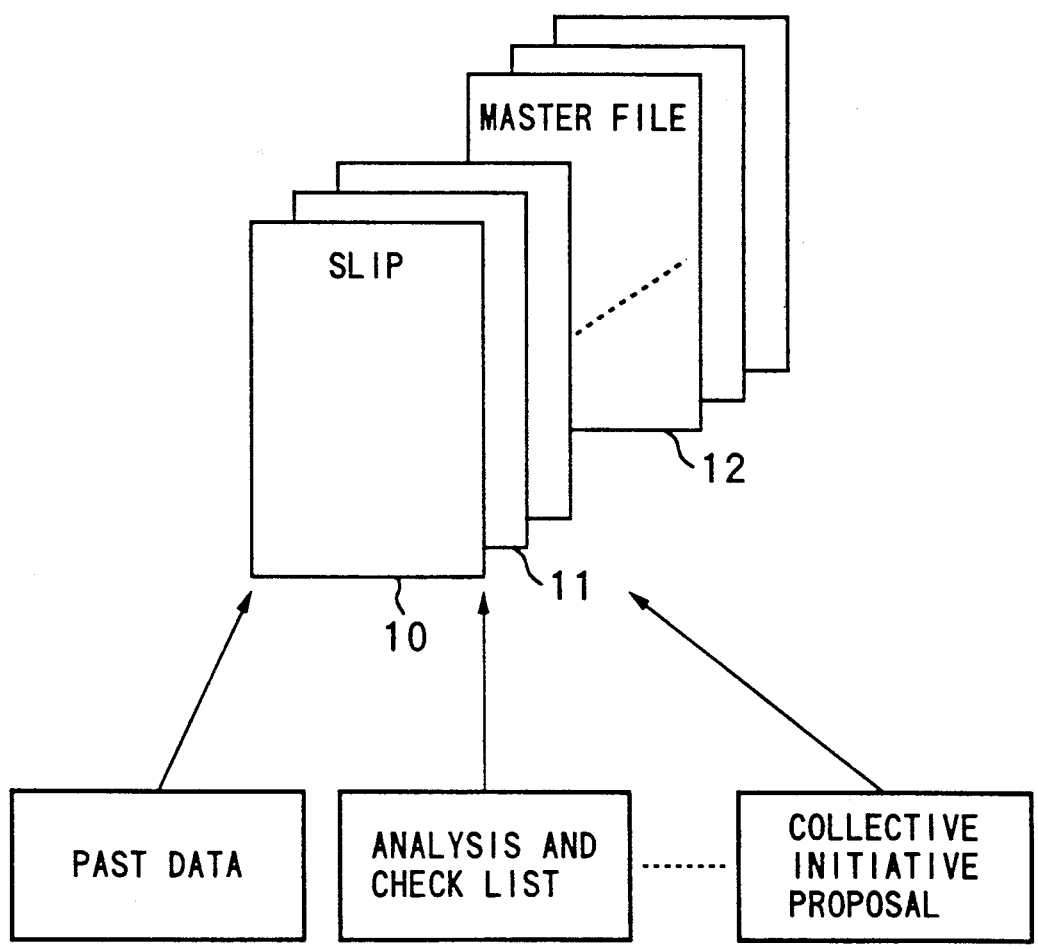
FIG. 5 is a view sketching how a master file and slips are listed according to the invention.

The listing performed in step S1 will be described in more detail. FIG. 5 sketches how a master file group 12 and a slip group 10 including miscellaneous vouchers 10 are listed according to the invention. Because necessary kinds of master files and slips vary with trade or with industry, these forms will be gathered on the basis of past data, analysis and cheek lists and/or collectively proposed initiatives.

Figure 4:
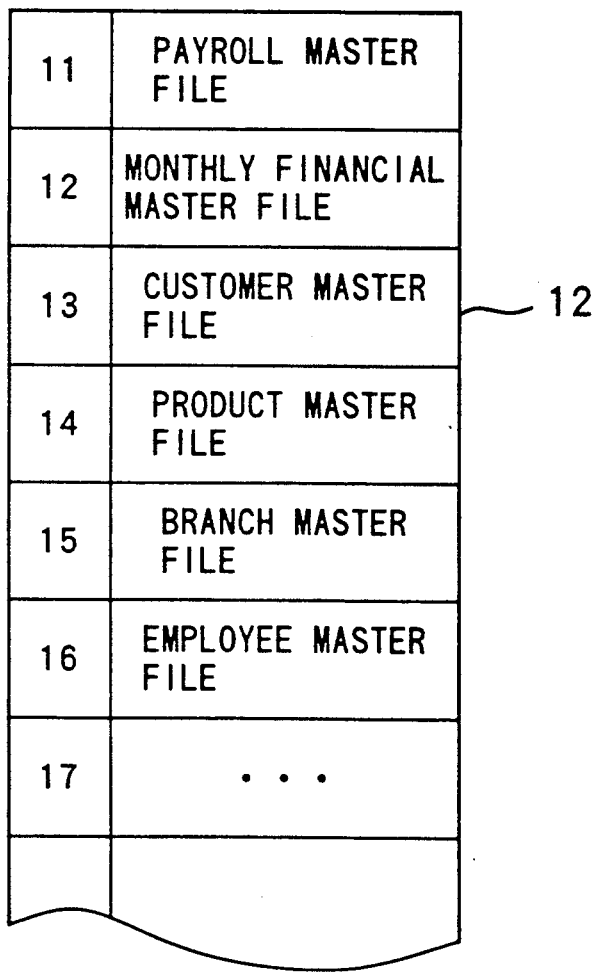
FIG. 4 is a view indicating a master file list according to the invention.

FIG. 4 indicates a specific master file list according to the invention. Master files include a payroll master file, a monthly financial master file, a customer master file, a product master file, a branch master file and an employee master file.

Step S2 breaks down the items that exist in the slips and selects those items needed for a given task. In step S3, the items broken down in step S2 are grouped under common headings where applicable, and the attribute of each item for processing by computer is determined along with the number of digits in each item.

Step S4 declares the items needed to control a given item as items common to AGL (automatically generated language) data processing, to be described later, and enters the control items into an item dictionary.

Step S5 defines records that serve as units of data for data processing. Of the set of the items declared in step S4, individual items and/or groups of items are handled as records. When a body of data is declared together with its optimum size for execution of the task, this body of data constitutes a unit for storage onto disk as well as a unit in which to handle the data.

Step S6 lists various basic processes needed to carry out the task in question, examines how these basic processes relate to one another, and verifies how records and individual items relate to one another in carrying out the basic processes.

Step S7 logically examines combinations of various procedures, of records, of basic processes, or of records with basic processes needed to carry out the task in order to prepare beforehand standard program bodies representing various specific flows of processing. Steps S1 through S7 when carried out complete an AGL grammar. Step S8 performs programming according to the AGL grammar. Step S9 executes the completed program.

Step S10 prepares a list of the current number, scope, functions and specifications of the hardware and firmware resources constituting the embodiment. The hardware resources include the CPU 1, CRT 2, printer 3, disk drive 5, and hard disk 8 or floppy disk 9. The firmware resource are made of various application programs, some of which are listed in FIG. 6.

Step S11 edits as needed the items, master file list, application program list and other resource lists prepared in step S10, and enters them as a database onto the hard disk 8.

Below is a more detailed description of how AGL (automatically generated language) commands are prepared; the preparation was briefly mentioned in connection with steps S6 through S8. First the accounting theory applicable to the task in question is analyzed so that the basic components of the accounting knowledge relevant thereto will be extracted or, if necessary, created. Also according to the analysis of the accounting theory, a programming language based on the abovementioned basic components is classified and specialized by function for accounting purposes. Attributes of functional command groups are extracted so that the basic components will be functionally assigned to the corresponding commands.

The kinds of commands include: database commands for accessing files (i.e., reading, writing, deleting), calculation commands (add, subtract, multiply, divide), fractional calculation commands, bit operation commands, account-related commands (for setting, converting, inputting or displaying accounts), data movement commands, data input and display commands (for drawing ruled lines, displaying messages and permitting key input), control commands (for labeling and branching), and card calling commands for calling subroutines.

The database commands provide functions for setting data to select an application program; for creating a file; for starting access to a file (to enable reading or writing); for designating the buffer that defines the area for reading and writing; for reading data from a file; for writing data to a file; for deleting a record; for correcting data; for ending access to a file (to disable writing or reading); for deleting a file; for designating the area to read data into; and for designating conditions for reading in data.

The bit operation commands provide functions of AND, OR, EOR, NOT, and leftward/rightward shift.

The account-related commands offer functions for setting an account to which to designate a data set number; for changing accounts (i.e., to change intra-account codes or input codes, to switch account names, or to designate data to an account); and for inputting an account (i.e., to input an account to a designated location on the screen by input code or in alphabetical order). The data movement commands have functions for moving data items between the same data types; and for copying data between record buffers (i.e., to copy data between records).

Figure 7A:
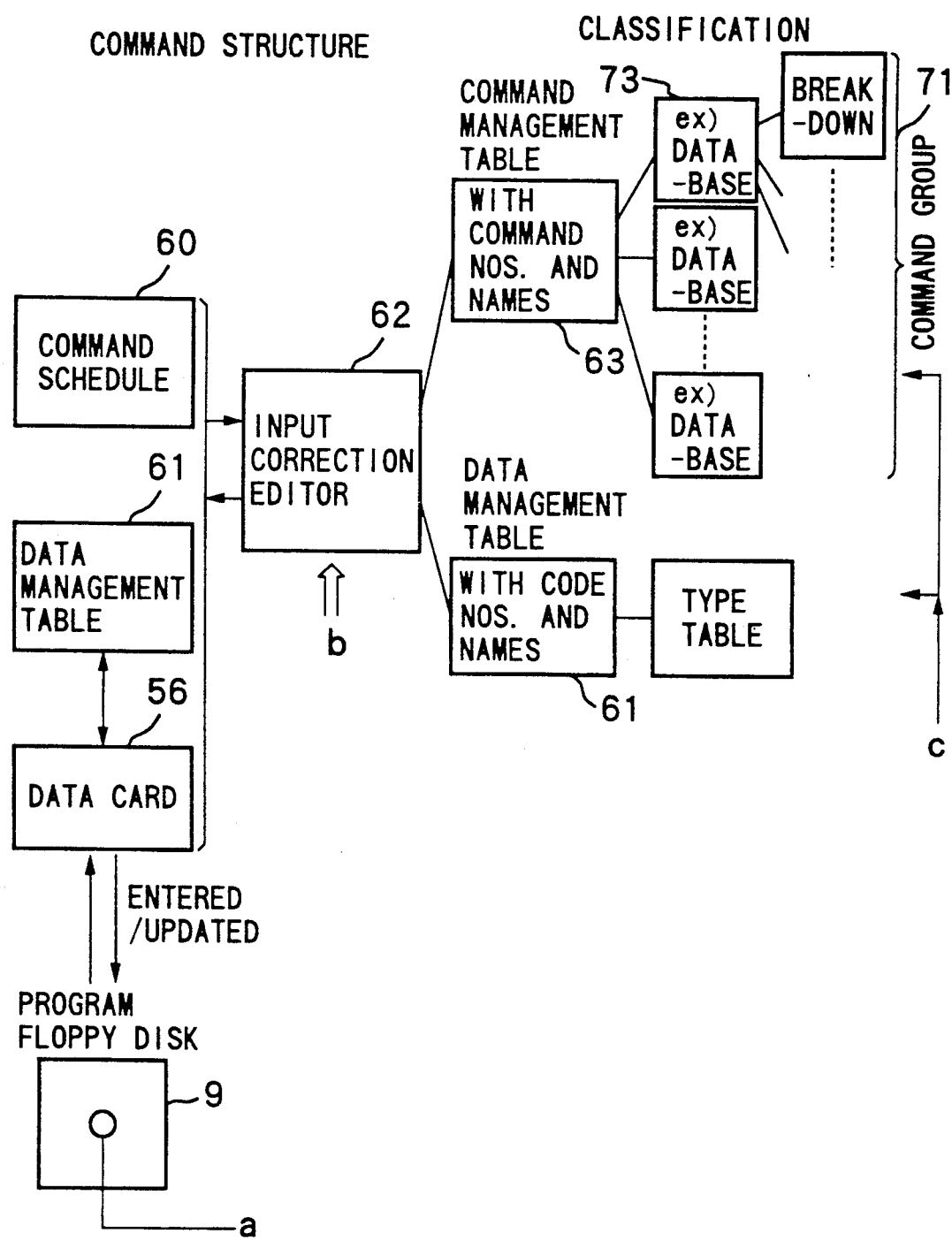
FIGS. 7A and 7B are views describing a command structure according to the invention.
Figure 7B:
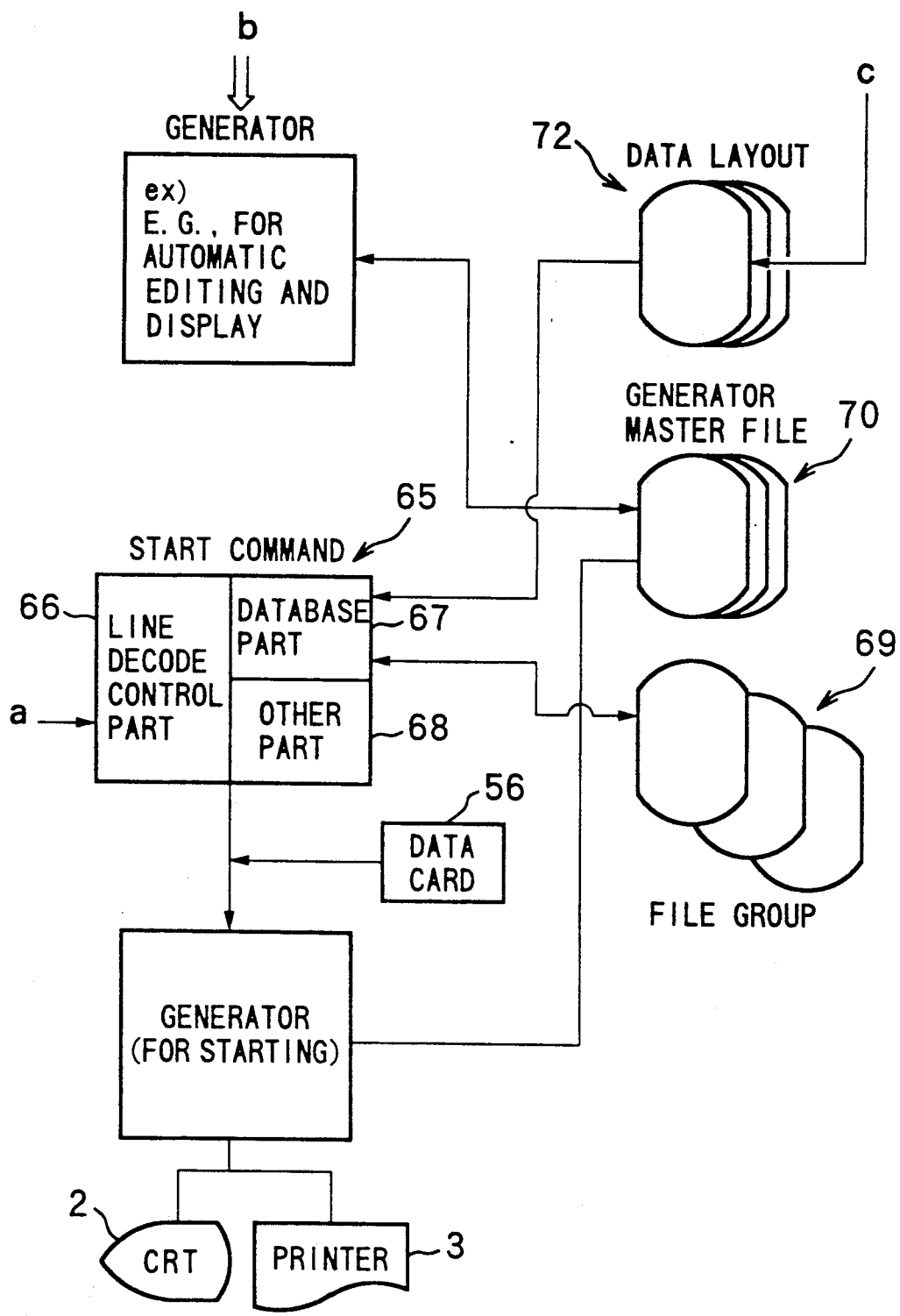

FIG. 7 describes a command structure according to the invention. In the structure of FIG. 7, a command schedule 60, a data management table 61 and data cards 56 interact with an input correction editor 62. Various commands are roughly classified by task in a command management table 63. Such command classifications are further divided into command groups 71 that are entered onto the hard disk 8 or the like for management. The data management table 61 classifies by type the data to be handled by the commands, and manages the data cards 56 as well. The commands include a wide range of instructions for addressing minutely defined objectives, i.e., arithmetic instructions for add, subtract, multiply and divide operations as well as bit operations; macro instructions for financial processing; and instructions for tabular manipulations.

A line decode control part 66 of a start command 65 loads programs from the floppy disk 9 or hard disk 8 of FIG. 1. A database part 67 of the start command 65 references a data layout 72 and gains access to a file group 69. In addition, the start command 65 causes each generator to run the data cards 56 for execution of automatic editing display or other functions based on a generator master file 70.

Step S12 allows the slips and various master files filled with actual data to be input from the keyboard 4 or OCR 7. Step S13 causes the diverse application programs to work on the slips and various master files containing the actual data in accordance with accepted accounting rules, knowledge and know-how. The result is processed directly by the CPU 1 or automatically programmed for display, printing and/or storage into the applicable resources.

A database 73 comprises actual data stored in the magnetic storage and the attributes representing the characteristics of these data. The stored data are subjected to predetermined processing. Two types of actual data exist: numeric type data (e.g., amounts of money) and character type data (e.g., employee names). The types and attributes of the actual data are established at the outset of processing. Once the actual data have been stored, their types or attributes are difficult to modify.

Figure 8:
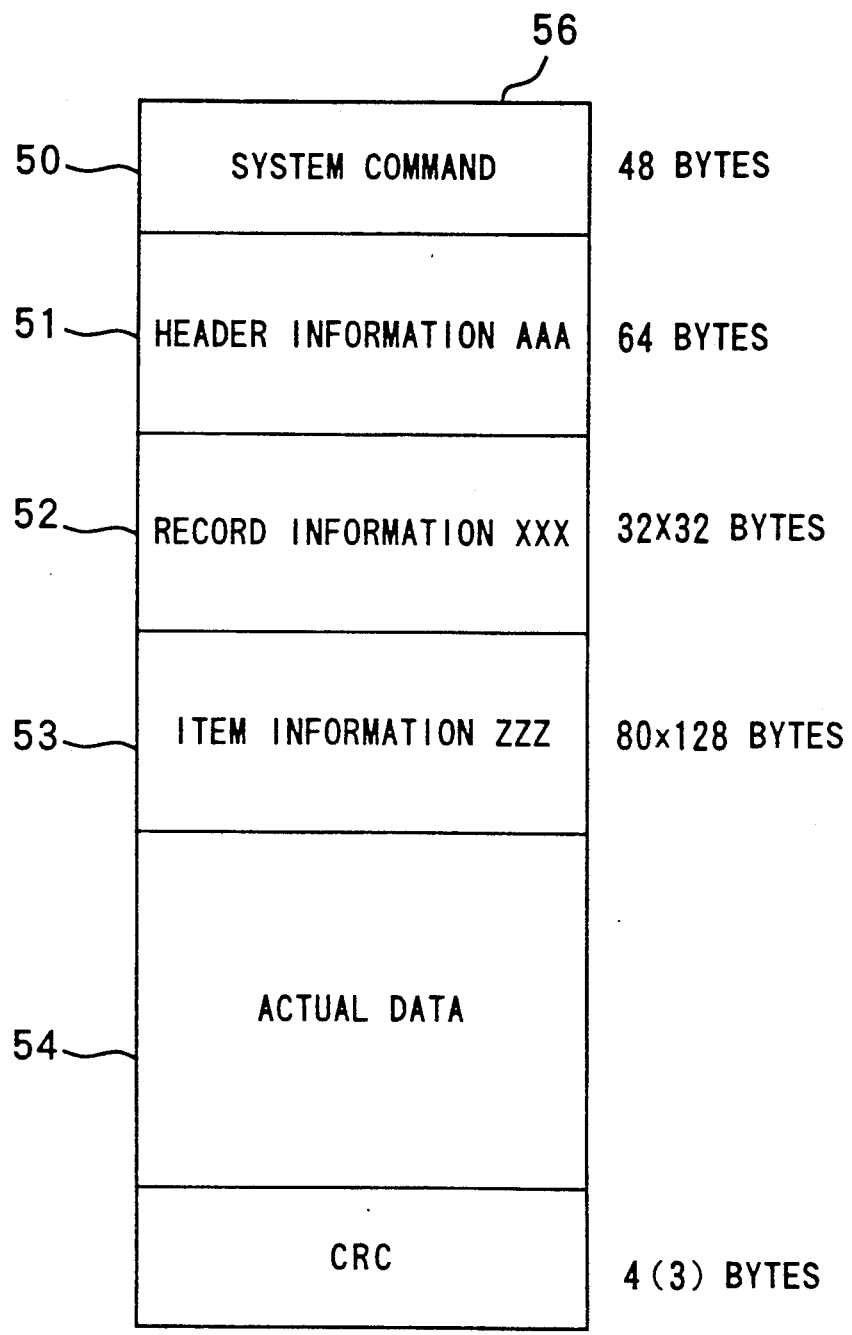
FIG. 8 is a view presenting an overall structure of a data card according to the invention.

A data card 56 shown illustratively in FIG. 8 is created in memory and provides a vehicle through which program modules exchange data. As will be described later in more detail, the data card 56 is made of actual data and the attributes representing the characteristics of these data. However, the data card 56 has no information that would restrict the manner in which the actual data are stored. Thus even after a program is created, the data card 56 is easy to modify. Additional data cards may be created every time a program is created using the same stored data.

As depicted in FIG. 8, the data card 56 is made of a system command block 50, a header information block 51, a record information block 52, an item information block 53 and an actual data block 54 formed in a memory map. The header information block 51 contains the name of the data card and the name of a destination module.

The record information block 52 indicates how many records made of items are contained in the data card and how many items constitute each record.

The item information block 53 declares the size and data attribute of each of the items constituting each of the records contained in the record information block 52. Also included in the item information block 53 is information about the location of the actual data that follows the block 53. The arrangement allows the association between each of the items and the actual data to be managed.

The actual data block 54 provided at the end of the data card comprises actual data in accordance with the data specifications in the item information block 53. The actual data are stored in units of both items and records, as defined in the record information block 52.

Each of the blocks making tip the data card 56 of FIG. 8 will now be described in more detail with reference to FIGS. 9 through 11. In FIG. 9, the header file construction of the header information block 51 defines the file ID as AAA, the block size as 1, the record length as 64 bytes, the maximum header count as 1, and the user information length as 128 bytes. For example, the first item is named "module name," starts at location 0, is 16 bytes in size, has 16 digits, is alphanumeric and kana in character type, belongs to the character data type, and is subject to logic operations. The names and attributes of the second and subsequent items are as listed in FIG. 9.

In FIG. 10, the record file construction of the record information block 52 defines the file ID as XXX, the block size as 1, the record length as 32 bytes, the maximum record count as 32, and the user information length as 128 bytes. For example, the second item is named "record count," starts at location 4, is 2 bytes in size, has 4 digits, is a positive integer in character type, belongs to the numeric data type, and is subject to arithmetic operations. It is shown that a maximum record count is 1,024. The names and attributes of the items other than the second item are as listed in FIG. 10.

In FIG. 11, the item file construction of the item information block 53 defines the file TD as ZZZ, the block size as 1, the record length as 80 bytes, the maximum item count as 4,096, and the user information length as 128 bytes. For example, the fourth item is named "item size," starts at location 40, is 4 bytes in size, has 5 digits, is a positive integer in character type, belongs to the numeric data type, and is subject to arithmetic operations. The names and attributes of the items other than the fourth item are as listed in FIG. 11.

Below is a description of how the names of the items in FIGS. 9, 10 and 11 are entered into an item name master file. The entry involves putting into storage the title of every itemized data unit as an item name. Item names may be input in one or both of two character types: in kanji characters, and in alphanumeric/kana characters.

The byte lengths and location assignments in the data card 56 are structured beforehand in such a manner that the hardware of the data processing apparatus for use with the inventive method will readily process the information in response to predicted digit counts. The attributes defined up till now constitute data characteristics, to be described later. These attributes include the data cards 56 and various attributes for the item dictionary of deposit and other slips and for each master file.

Step S4 involves the entry of items. How a simple item entry is performed will now be described in specific terms with reference to FIGS. 12 and 13. Illustratively, deposit slips are named "Aii"; payment slips, "Bij"; sales slips, "Cii"; purchase slips, "Dij"; .... miscellaneous slips, "Kij." These slips are specified by such codes as 0001, 0010, 0011, 0100, ..., 1011. The character "j" of the subscripts "ij" represents natural numbers such as 1, 2, 3, etc. For deposit slips, "Ai1" may illustratively stand for dates, "Ai2" for account names, and "Ain" for miscellaneous attributes (items). The character "i" of the subscripts "ij" also represents natural numbers such as 1, 2, 3, etc. The numbers of the character "i" define those different slips of the same type which pertain to actual data about different transactions that occurred, say, on different dates.

The item entry in step S4 also involves defining detailed attributes of individual slips, as shown in FIG. 13. For example, on a deposit slip named "A1j," the characters "A11" (j=1) stand for a "date" item. This item is 4 bytes in length, is located from byte 0 to byte 3, is hexadecimal (HEX) in signal type, belongs to the numeric data type (set to "1" in numeric/character data type division), and is thus subject to arithmetic operations. The actual data are also indicated; the data constitute a variable that says May 11, 1991.

On the same deposit slip named "A1j," the characters "A12" (j=2) stand for a "code" item. This item is 4 bytes in length, is located from byte 4 to byte 7, is hexadecimal (HEX) in signal type, belongs to the character data type (set to "0" in numeric/character data type division) and is thus exempt from arithmetic operations. The actual data of the item constitute a constant that indicates identification. Furthermore, the characters "A13" (j=3) stand for an "amount" item. This item is 7 bytes in length, is located from byte 8 to byte 14, is hexadecimal (HEX) in signal type, belongs to the numeric data type (set to "1" in numeric/character data type division) and is thus subject to arithmetic operations. The actual data of the item constitute a variable that indicates Y3,500 in this example.

The "date" item of "A11" (j=1) may be supplemented by additional attributes, as needed, in the arrowed direction X of FIG. 13. Other items of "A1i" (j=4, 5, 6, ..., n) may also be added in the arrowed direction Y. In FIG. 5, separate slips "A1j,""A2j,"-"A3j," etc. make up a stack of the input slip group "A1j" wherein only actual data differ among the slips, i.e., where the value "j" (1, 2, 3, etc.) represents a different transaction each.

Each of the various master files (e.g., the data set of a monthly financial master file) is designed beforehand to constitute always the memory map of FIG. 8. The hardware of the computer relies on the subscript "ij" method described above for identification of various attributes. Such identification is performed conventionally and the description thereof is omitted herein. The system command 50 in the system area of the data card 56 is a program that adds the header information 51 and other relevant information to the actual data to form the memory map of FIG. 6.

Step S10 of FIG. 2 creates lists about hardware and firmware resources. How these lists are created will now be described in detail with reference to FIG. 14 and to the flowcharts of FIG. 15 and subsequent figures.

Step S14 of the flowchart of FIG. 15 creates a list of the characteristics of the keyboard 4 as input hardware. Such characteristics include availability of keyboard use in Japanese, English or both; use of symbols that may be input through the keyboard; and so on. Relevant items regarding various kinds of hardware for data display are then established. That is, step S15 specifies the display screen size of the CRT 2 (in inches). Step S16 specifies the resolution of the CRT 2 in dots (1,032×1,032 dots, 760×460 dots, etc.).

Where horizontally and vertically arranged dots on the screen of the CRT 2 are called lines and columns, respectively, step S17 defines using vertical and horizontal dot counts the size of a single column that is actually used for display. Step S18 specifies using vertical and horizontal dot counts the size of a single character representing the basic dimensions of each alphanumeric character to be displayed on the screen. Step S19 designates using vertical and horizontal dot counts the size of a single kanji character representing the basic dimensions of each kanji character to be displayed on the screen. Step S20 specifies using vertical and horizontal dot counts the character-to-character space representing the basic dimensions of each space to be placed between characters when alphanumeric or kanji characters are displayed. With these sizes defined, various character types (.double-size, italic, etc.) are determined in terms of the number of individual character digits and the basic dimensions of kanji and other characters.

Step S21 specifies using column and line counts the size of a maximum output screen line-column frame as an effective display frame. This frame is a rectangle created on the screen by designating a plurality of columns over a plurality of lines. The frame in turn determines the maximum numbers of lines and columns available per character on the display screen. The maximum output screen line-column frame is made of the entire dots that may be displayed simultaneously on the CRT 2. For example, the dot count of 1,032 by 1,032 or 760 by 460 represents the resolution of the screen.

Step S22 specifies whether the CRT 2 is to be a color or a black-and-white type. Step S23 designates whether a multiple window capability is to be used for display. Step S24 specifies whether kana, kanji, alphabetic and German characters are to be used for display. Step S25 enters the lists and various attributes prepared as described above. In this manner, the CRT specifications 23 and other related characteristics are defined and made into the structure sketched in FIG. 14.

The attributes of the printer 3 are now designated and entered as per the flowchart of FIG. 16. Step S26 designates a thermal printer, a dot printer or a laser printer. Step S27 specifies a color or a black-and-white printer and, where the color printer is selected, defines how many colors are to be used. Step S28 designates the number of columns per line and the number of lines per column. Step S29 specifies a graphic printer or a character printer. Step S30 defines the character types that may be used (kana, alphabetic, kanji, etc.). Step S31 specifies the size and type of the paper to be used and the manner in which the paper is fed. Step S32 enters all the specifications and attributes designated above. This establishes the printer specifications 24 indicated in FIG. 14.

Figure 17:
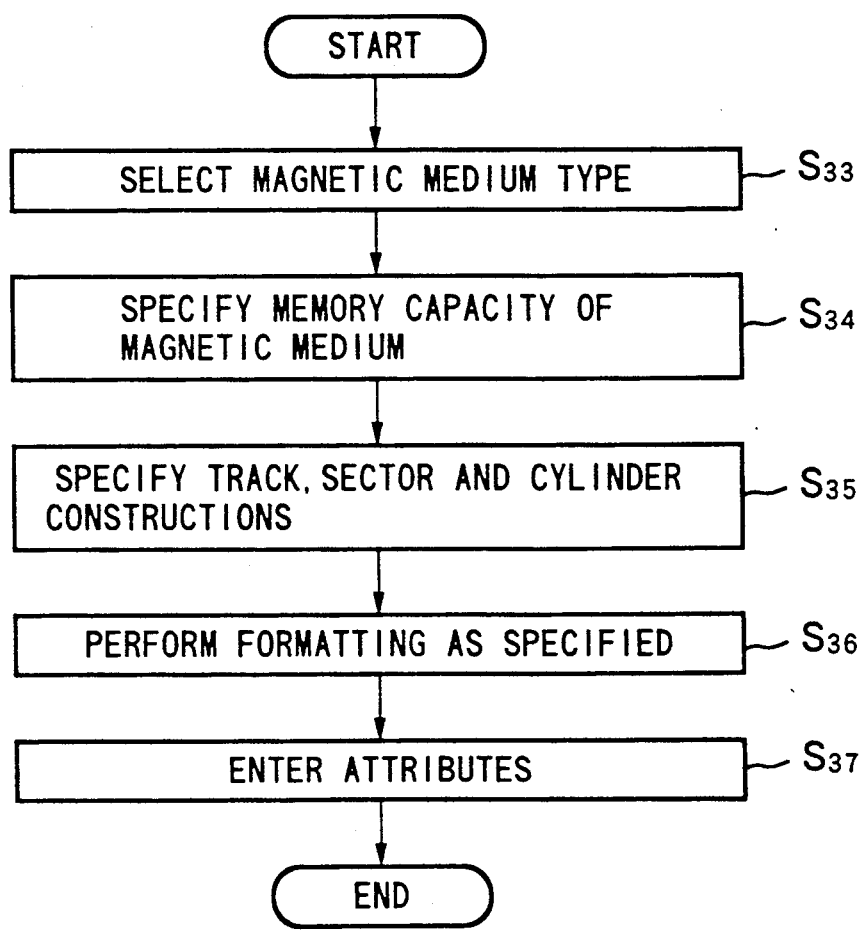
FIG. 17 is a flowchart of steps in which to enter magnetic medium attributes according to the invention.

Referring now to the flowchart of FIG. 17, step S33 selects the type of magnetic medium that is operated in magnetic storage: floppy disk 9, hard disk/cylinder disk 8, or both. Step S34 specifies the memory capacity of the magnetic medium to be used. Where the hard disk is illustratively selected, step S35 designates the track, sector and cylinder constructions desired. Step S36 checks to see if the hard disk has been formatted. Step S37 enters the characteristics and attributes designated above. This establishes the specifications 25 of the magnetic medium containing detailed information about magnetic storage 8 or 9 indicated in FIG. 14.

Figure 18:
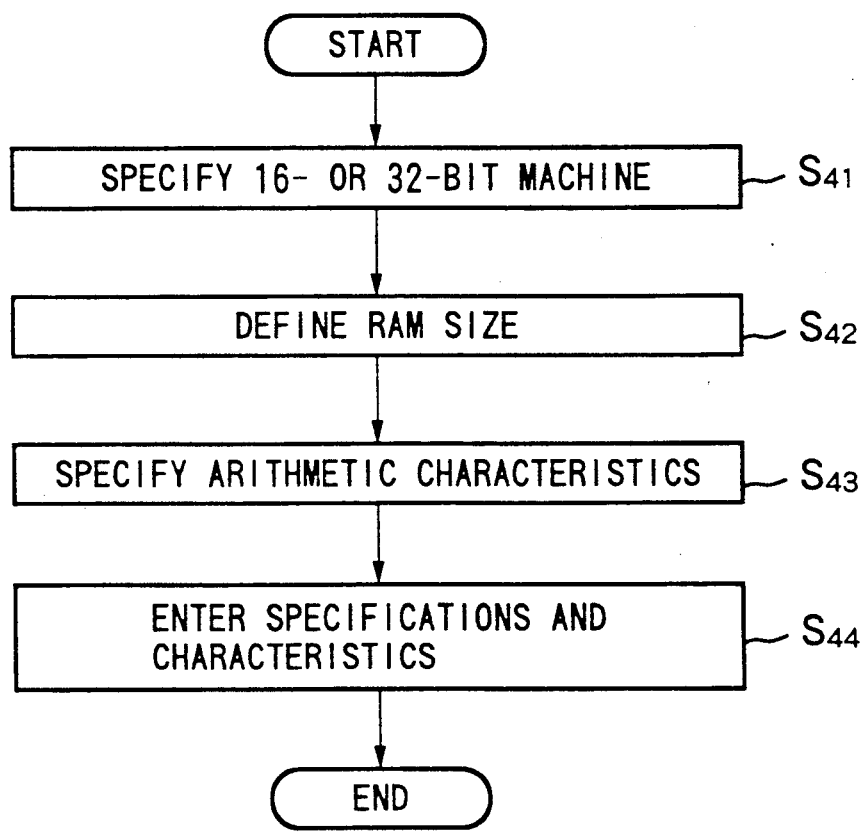
FIG. 18 is a flowchart of steps in which to enter CPU attributes according to the invention.

Referring to the flowchart of FIG. 18, step S41 specifies whether the CPU 1 is to be a 16-bit machine or a 32-bit machine. Step S42 defines the required RAM size in kilobytes. Step S43 designates arithmetic characteristics such as the use of the floating or fixed point, maximum number of digits, and others. Step S44 enters the above-described characteristics. This establishes the CPU characteristics 26 and the arithmetic characteristics 27 indicated in FIG. 14.

Figure 19:
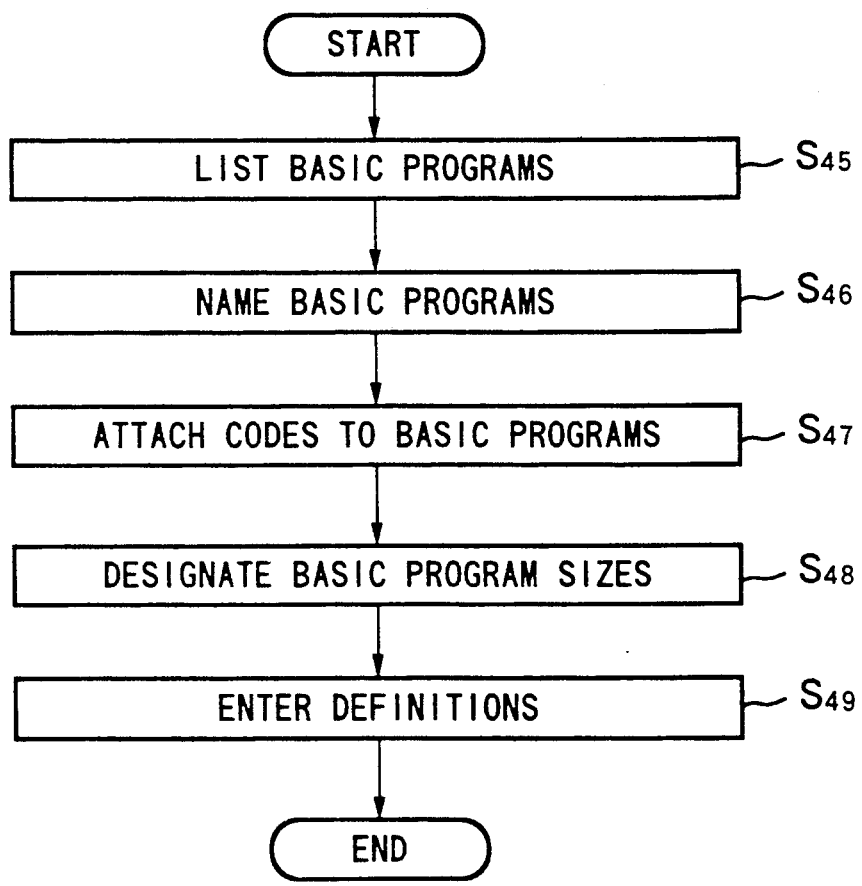
FIG. 19 is a flowchart of steps in which to enter basic program attributes according to the invention.

The characteristics of the firmware resources such as the basic programs 6 of the application programs listed in FIG. 6 are now designated and entered as per the flowchart of FIG. 19. Step S45 lists the basic programs 6 that are furnished. The application programs include a balance sheet (B/S) program, a profit and loss statement (P/L) program, a trial balance of account balances program, and others. Furthermore, step S45 comments on each of the basic programs 6 in terms of function (.i.e., what kind of accounting job the program performs), purpose (to what end the program runs) and object (data and master file that the program works on). Although the comments on the functions, purposes or objects of the basic programs are unnecessary for accounting specialists, they are convenient for use by novices in the field of finance.

Step S46 names the basic programs 6, illustratively assigning "a" to the balance sheet (B/S) program, "b" to the profit and loss statement (P/L) program, "d" to the trial balance of account balances program, and so on. Step S47 adds codes to the basic programs 6, illustratively attaching "1001" to the balance sheet (B/S) program, "1010" to the profit and loss statement (P/L) program, and so on. Each program is accompanied by designation of the bit count of the machine on which it runs. Step S48 specifies the size of each of the basic programs 6 in terms of such attributes as the total number of the bits occupied for program accommodation in magnetic storage, the maximum memory capacity required for program operation, and the number of digits needed for arithmetic processing involved. Step S49 enters the above definitions and characteristics, thus establishing the program characteristics 28 indicated in FIG. 14.

Figure 14A:
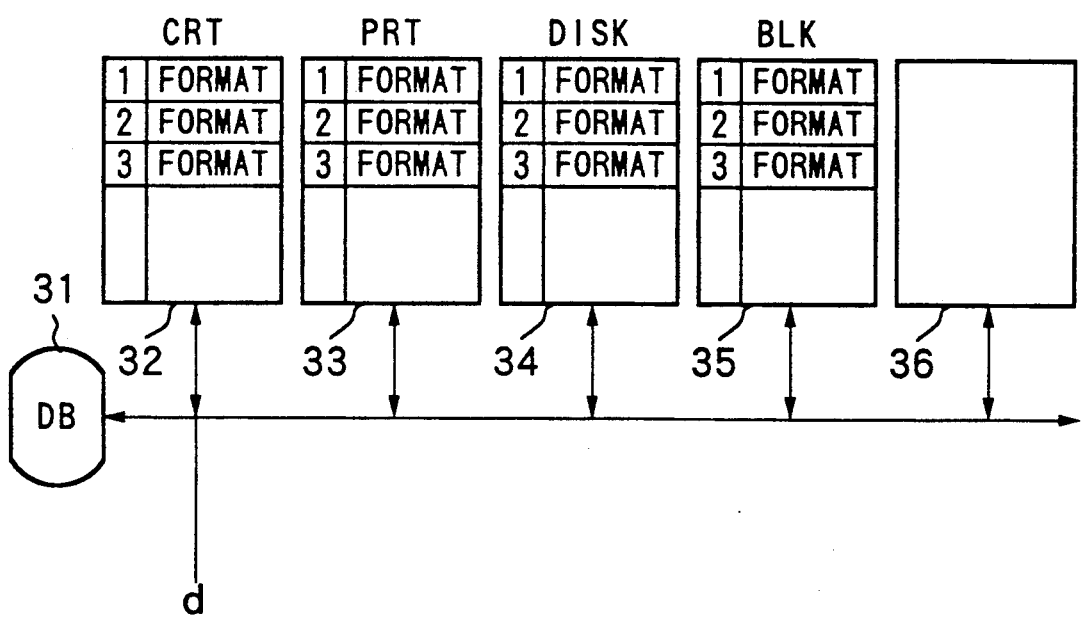
FIGS. 14A and 14B are overall block diagrams of firmware according to the invention.
Figure 14B:
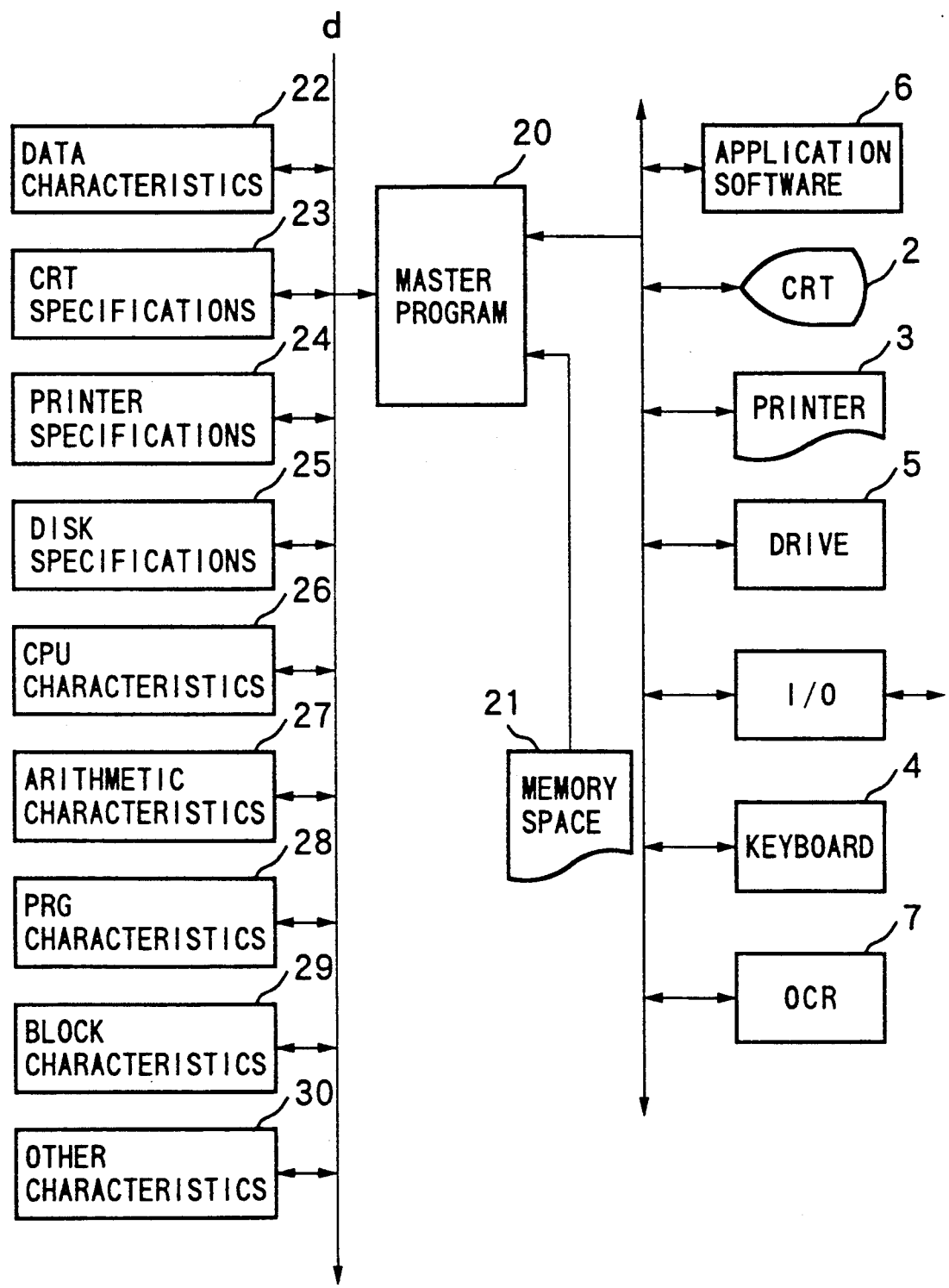

Likewise, the characteristics of other firmware resources are designated, entered, and established as needed in the form of miscellaneous characteristics 30 (including keyboard characteristics) indicated in FIG. 14. Block data characteristics 29 will be described later.

Figure 20:
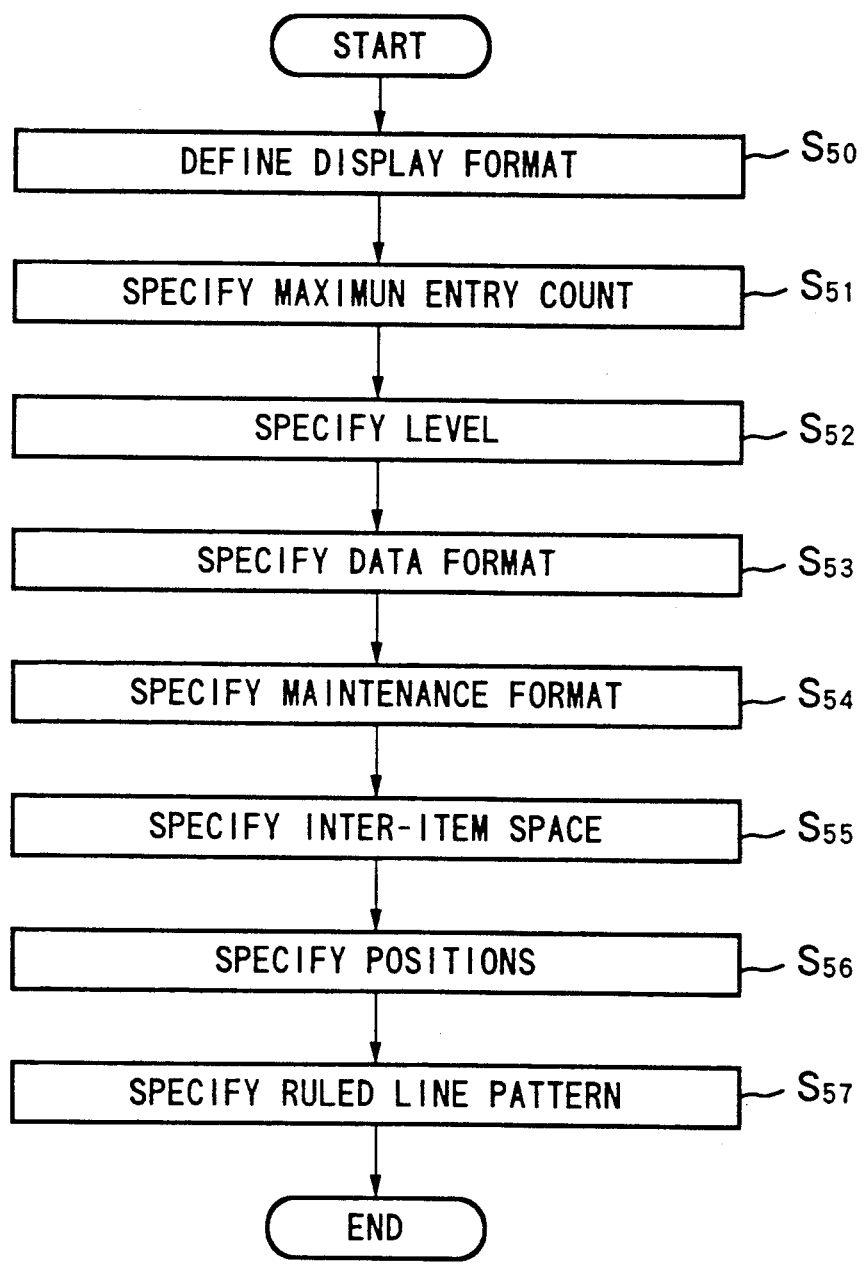
FIG. 20 is a flowchart of steps in which to establish a data processing procedure according to the invention.

An automatic editing display generator is set Lip according to the flowchart of FIG. 20. The process involves setting necessary items for the data output on the CRT 2 and other resources. Step S50 designs patterns 1, 2, 3, etc. as screen layouts, thereby establishing a CRT display priority format 32 of FIG. 14. Step S51 designates the maximum number of entries for display on the CRT 2 in accordance with the data characteristics 22 and CRT specifications 23 from the data card 56 in item dictionary or memory map form. The maximum number of entries comes in two types: the number of screen layouts, and the number of items to be displayed. The screen layouts are those automatically generated by each of the designated systems.

Step S52 designates the screen master creation level at which to create screen layouts automatically. Step S53 selects a display item name master file display data format in which to designate whether to use a stored kanji name or alphanumeric/kana name upon referring to the display item name master file during creation of a screen layout.

Step S54 selects a display item name maintenance format in which to designate whether to use a kanji name alone or both a kanji name and an alphanumeric/kana name upon entering the display item name master file. Step S55 specifies the item-to-item space in units of columns for use upon creating a screen layout automatically.

Step S56 designates the positional relationship between item names and item data upon creating a screen layout automatically. This step defines the name positions vertically and horizontally for the header area, the data area and the sum total area, with the data position taken in the middle. Step S57 specifies a ruled line pattern using 16 points that constitute a broken line pattern for changing the screen upon creating a screen layout automatically. Up to 16 ruled line patterns may be stored.

How the display item name master file is stored will now be described. A display item name is the title of each display item data unit. The display item name may be input in one of two name types: in kanji name, or in alphanumeric/kana name. The kanji name entry may involve both a kanji and an alphanumeric/kana name. The items to be stored comprise display item name codes, display item names (in kanji characters), Japanese alphabetic call signs, display item names (in alphanumeric/kana characters), alphanumeric/kana call signs, and object item codes. When the input is designated to be in kanji characters only, attempts to enter display item names in alphanumeric/kana characters or to enter alphanumeric/kana call signs are rejected. The stored contents may be retrieved and corrected using display item name codes, Japanese alphabetic call signs, alphanumeric/kana call signs or object item codes.

Below is a description of how the entry of the screen master file takes place, one of the functions of the automatic editing display generator. Initially, the item to be displayed on the screen (i.e., display item) is selected and its display position is designated by referring to the data layout either in AGL data cards or in the database. For the setting of automatic editing and display, the target data are taken from the file whose layout is provided by the AGL data card or by the database. Upon reference to the screen master file, the data are displayed on the screen.

Then comes the designation of the display item areas corresponding to the position specified in step S56. There are four areas that divide the display item: header area, data area, sum total area, and unnecessary area. The header area appears in the top part of the screen and is treated as fixed information about the data. The data area appears in the middle part of the screen and is treated as a subdivided data item. The total sum area appears in the bottom part of the screen and provides sum totals of data. The unnecessary area represents items that are not needed in creating the current screen. When the actual layout is created, the display position of the unnecessary area cannot be designated.

For display based on the AGL data card, the automatic layout editing function for storing of the screen master file may be utilized. That is, the function may be used to display data whose screen layout is not created.

Next, the number of lines for the data area to be displayed on one screen is designated. Where automatic layout editing is carried out, the item data and the item name positions are verified, and an automatically created screen appears on the CRT. Thereafter the items are switched individually. If automatic layout editing is not carried out, the items to be displayed and the display item names are called up onto the screen in an interactive manner and set where desired.

The items to be displayed may have editing information, qualifier information and color information set thereto. The editing information, when displayed in characters, may be enlarged, contracted or inverted as designated. The qualifier information is specified when the data to be displayed are to be prefixed with or be rid of 0, to have a comma and/or slash inserted therein, or to have a date-related characters added thereto. The color information becomes effective when the CRT in use is a color CRT. Item data and item names may be colored using designated colors. There are three types of ruled lines: thick lines, ordinary solid lines and broken lines. The broken ruled lines set by the user during system setup may also be invoked and utilized.

Figure 21:
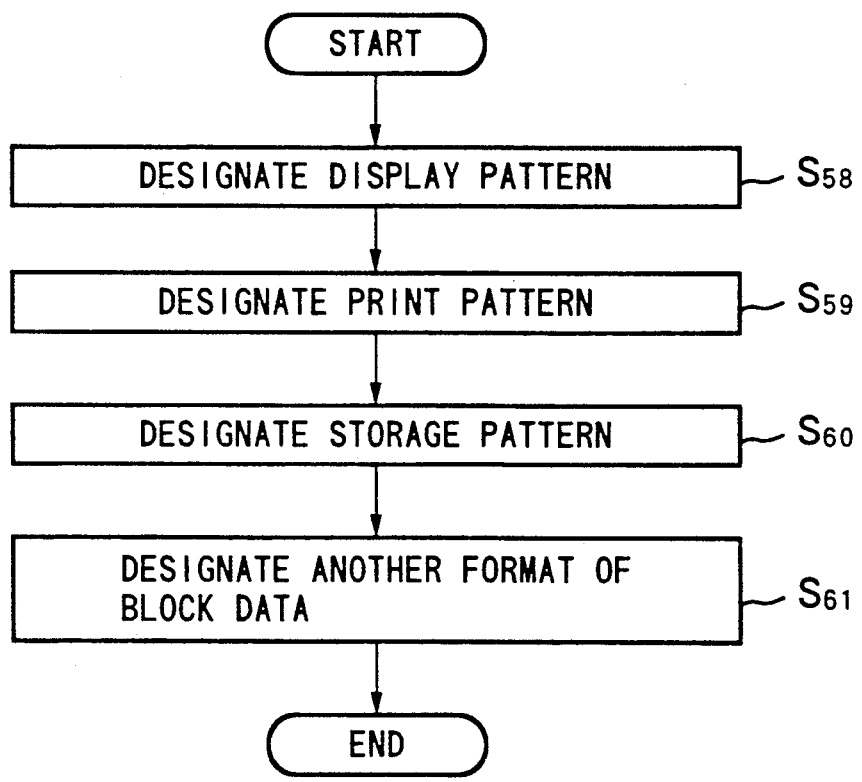
FIG. 21 is a flowchart of steps in which to establish an output format according to the invention.

Specific steps of the above entry are as follows. Referring to the flowchart of FIG. 21, step S58 designs patterns 1, 2, 3, etc. in which to print data on the printer 3 in accordance with the data characteristics 22 and the printer specifications 24. This establishes the printing priority format 33 indicated in FIG. 14.

Step S59 designs patterns 1, 2, 3, etc. in which to store slip data to the magnetic storage such as the hard disk in accordance with the data characteristics 22 and the magnetic medium specifications 25. This establishes the disk storage priority format 34 indicated in FIG. 14. Step S60 designs patterns 1, 2, 3, etc. in which to store block data to the magnetic storage such as the hard disk according to the data characteristics 22 and the block data characteristics 29. This establishes the disk storage priority format 35 indicated in FIG. 14. Likewise, step S61 designs other formats as needed to establish another format 36 shown in FIG. 14.

The database will now be described. First to be described is a database provided as an independent processing module (a kind of program). Stored data are set so as to prepare an environment in which to generate a program module for access to the database. The CRT command, the print command, and the program module for access to the database are generated by simply setting the user's requirements such as necessary files, priority and scope of execution, and other conditions. There is no need to describe these requirements in a programming language.

The actual program is created using an interactive editor based on the AGL command grammar. At this point, database input and output, screen display and printer output are independently executed functions. Data exchanges between processing modules are carried out via a data card 56. The data card 56 contains the data and attributes required by each module. As discussed, the attributes are managed in terms of header information, record information and item information. Different pro&,rams are combined depending on the desired type of processing. The data within the data card 56 thus differ accordingly. Since the attributes are stored as header information, record information and item information, the actual data are referenced by receiving the data card 56 and by developing the data therein in units of items. The actual data received via the data card 56 are associated with database commands and with the information defined by the generator on the output side. This permits storage, display and printout of the data necessary for the processing in question.

What follows is a description of how the user illustratively inputs master files and slips containing actual data into the data processor in question; reads these master files and slips from the database; causes various application programs to work on the retrieved data in accordance with accepted accounting rules, knowledge and know-how so as to obtain collections of data that are significant from an accounting point of view; and displays, prints or stores such collections of data using appropriate resources. Described first will be the programming for creating the budget versus actual expenditure list of FIG. 22, followed by the output processing by use of the data card 56.

Figure 23:
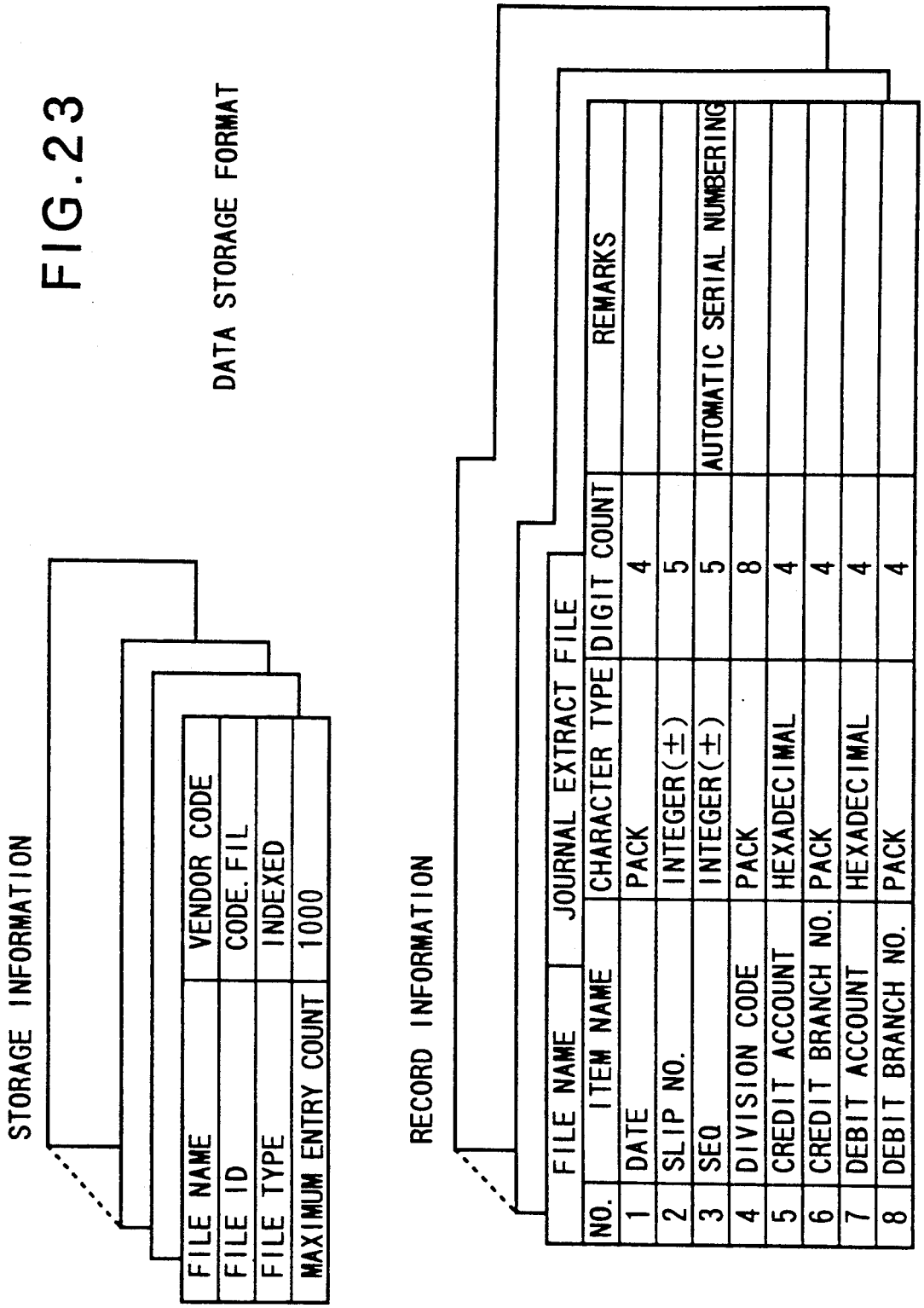
FIG. 23 is a view depicting a data storage format according to the invention.

A database db is constituted by records (FIG. 23) making up an item dictionary. The item dictionary contains items collected and assorted as shown in FIG. 29. Source data are retrieved from the database db and processed as needed by a command module (program COM). The processed data are set as output data in accordance with the specifications of the data card 56.

The data card 56 is received on the output side (for display, printing, etc.) as per unified specifications. An automatic editing function is then used to get from stored files the information needed by the output side (e.g., display lines, column display attributes, ruled lines). After this, the actual data in the data card 56 are displayed on the CRT 2.

Printing takes place in the same manner as display. That is, display lines, column display attributes and ruled line information are obtained from stored files. The actual data are printed on the printer 3.

Below is a description of the automatic editing function that is executed prior to the output to the CRT 2 or printer 3. Data items are divided into three areas: header item area, data item area, and sum total item area. When information about these areas is designated, the automatic editing function makes it possible to determine the title data display position of each data unit based on the standard layout characteristics offered by the system. Use of the automatic editing function eliminates the need for manually setting complicated data display positions and permits easy creation of a well-balanced screen layout.

One notable feature of the data card 56 is that when various independent modules (e.g., database db, command module COM, automatic editing display generator, print generator) exchange data among them, each module may create its own data according to unified specifications without having to become aware of the other modules. Any other system compatible with the same specifications may permit data input and output even through other functions. Various kinds of item-related information are available, as described above, from the header information 51, record information 52 and item information 53. Thus actual data many be referenced using these kinds of information.

Once the data card 56 containing actual data arrives at the printer 3, the data card 56 is subject to only to the printer specifications 24 and is immune from the constraints of any other module while the actual data are being printed on the printer 3. When the data card 56 containing actual data reaches the command module COM, the data card 56 is controlled solely by the commands of the command module COM for various operations, free from the constraints of any other module.

Figure 24:
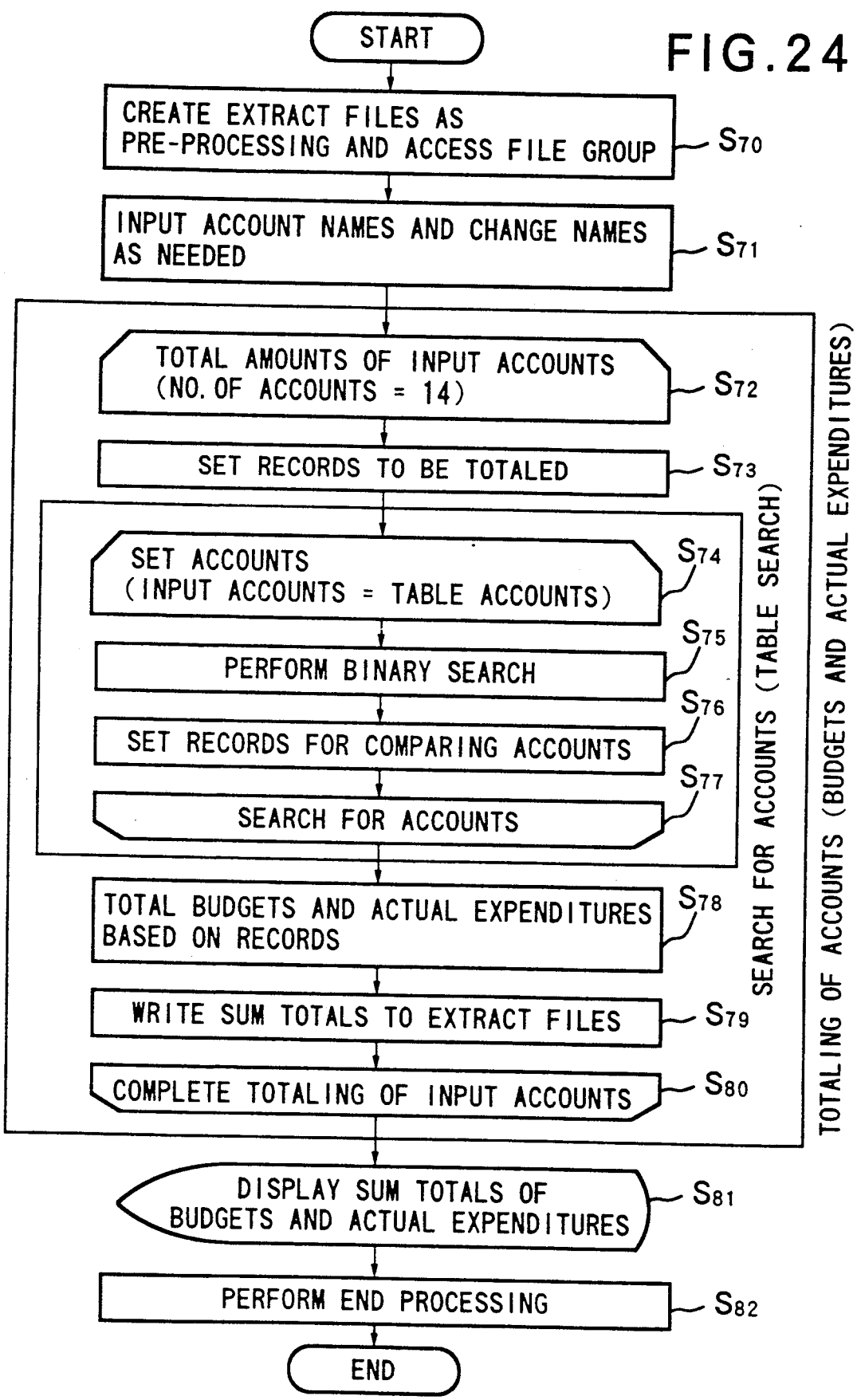
FIG. 24 is a flowchart of steps in which to execute a typical process according to the invention.

How step S13 (processing) of FIG. 3 is specifically executed will now be described with reference to the flowcharts of FIGS. 7 and 24. Step S70 creates extract files as preprocessing and gains access to the file group 69. Step S71 inputs account names and changes names as needed. Step S72 totals the amount of each of, say, 14 accounts. Step S73 sets records to be totaled. Step S74 sets accounts of a table as the input accounts for table search. Step S75 carries out binary search. Step S76 sets records for comparison of accounts. Step S77 searches for accounts now that necessary preconditions have been established.

Step S78 totals separately the budgeted amounts and the actual expenditures based on the records in question. Step S79 writes the sum totals to the extract files. Step S80 completes the totaling of the input accounts. Step S81 displays the sum totals of the budgeted amounts and the actual expenditures on the CRT 2. Step S82 terminates the processing by printing the final results or performing other appropriate operations. Steps S72 through S80 constitute the process for calculating the budged sums and actual expenditures. Steps 74 through S77 make lip the process for the search through the accounts by means of table search.

Figure 25:
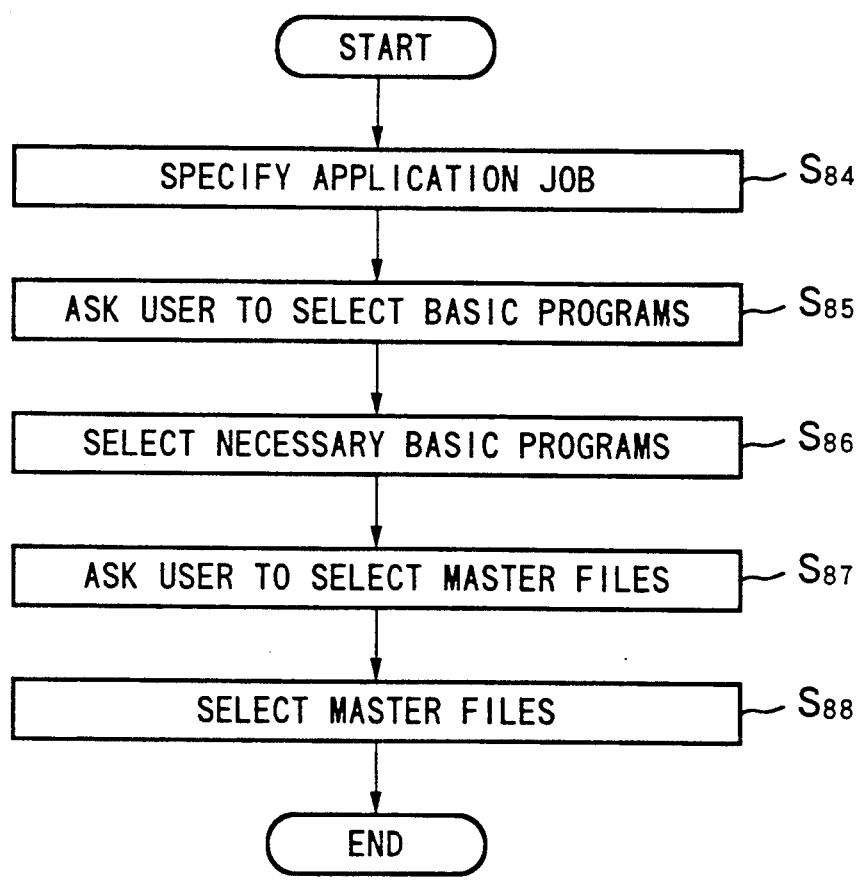
FIG. 25 is a flowchart of steps in which to create a program according to the invention.

The programming for creating the budget versus actual expenditure list of FIG. 22 through accounting operations will now be described with reference to the flowchart of FIG. 25. A financial job menu first appears on the CRT 2. The user in charge of accounting selects a job from among those in the menu. In step S84, creation of the budget versus actual expenditure list is selected. In response, a master program 20 enters step S85 and asks the user which of the basic programs 6 of a plurality of applications programs is to be utilized.

To prompt the user to respond in step S85, the master program 20 displays the multiple basic programs 6 of FIG. 6 in a menu format on the CRT 2. Since the user knows from experience which basic program 6 is needed to create the budget versus actual expenditure list, the user selects from the menu the appropriate job such as "Standard Finance [1]" using a data set according to accounting principles. If a plurality of basic programs 6 need to be combined to execute the current job, the user selects as many basic programs 6 as needed in step S86.

With the necessary basic programs 6 designated, the master program 20 asks the user in step S87 which master files are to be employed to execute the selected basic programs. To prompt the user to respond, the master program 20 displays the multiple master files of FIG. 4 on the CRT 2 in a menu format. Since the user also knows from experience which master files are needed to execute the designated basic programs 6, the user selects illustratively the monthly financial master file from the menu according to accounting principles. If a plurality of master files need to be combined with the monthly financial master file to execute, say, the "Standard Finance [1]," the user selects as many master files as needed in step S88.

Furthermore, when in executing the "Standard Finance [1]," the user recognizes the need to obtain arithmetic sums, differences or products between the monthly financial master data and the data from a plurality of master files, it is possible to carry out data operations thereon which are similar to those regarding the slips Aij and Bij (sum totals of $\Sigma$Aij and $\Sigma$Bij; ratio of $\Sigma$Aij/$\Sigma$Bij; etc.). For arithmetic and logic operations involving the monthly financial master file combined with a plurality of master files, the master program 20 combines the data characteristics 22 of FIG. 14 with the CPU characteristics 26 and the arithmetic characteristics 27, as in the case of data operations such as those for obtaining the ratio of $\Sigma$Aij/$\Sigma$Bij, so that the fastest and the most economical operations will be performed to output intermediate results.

Below is an illustrative description of how the processes described in the above flowchart sequence work and how the respective modules operate, by use of deposit and payment slips. Initially, the deposit slip Aij and the payment slip Bij of FIGS. 12 and 13 are input to the data processor through the OCR 7 of FIG. 1. According to the menu, the operator designates calculations for obtaining the sum totals $\Sigma$Aij and $\Sigma$Bij. After that, the operator designates calculations for obtaining the ratio of $\Sigma$Aij/$\Sigma$Bij and the budget versus actual expenditure list of FIG. 22. The results are displayed and/or printed.

More specifically, the data in the deposit slip Aij and payment slip Bij per transaction are moved, when read by the OCR 7, into a memory space 21 by the master program 20 of FIG. 14. The master program 20 combines the data card of the data characteristics 22 with the data in the deposit slip Aij and payment slip Bij. The result is stored into a database 31, Storage of data into the database 31 is carried oat as follows. The master program 20 compares the data of the input slip Aij containing the data characteristics 22 with the magnetic medium specifications 25, and stores the slip data according to the disk storage priority format 34. For storage of ordinary slip data into, say, the hard disk 3, the master program 20 in the CPU 1 automatically edits the slip data by referring to the current hard disk characteristics (i.e., hard disk capacity and other specifications) contained in the specifications 25. If the storage patterns are assigned their priorities (1, 2, 3, etc.) beforehand and if no instructions are entered from the keyboard 4, the data are stored according to the predetermined pattern I in the most economical manner of memory distribution. If the operator chooses to select the pattern 2 using the keyboard 4, the pattern 2 instead of the default pattern 1 may be used to store the slip data.

The actual data read by the OCR 7 from each master file are moved into the memory space 21 by the master program 20 of FIG. 14. The master program 20 combines the actual data in each master file (e.g., monthly financial master file) with the header information 51, record information 52 and item information 53 to create a data card 56. Then the master program 20 compares the data of the monthly financial master file in the data card format with the magnetic medium specifications 25 so that the data card 56 will be placed onto the hard disk according to the disk storage priority format 34.

When the operator designates execution of sum total operations, the master program 20 retrieve from the database 31 the data of deposit slips A1j, A2j, A3j, ..., Aij of individual transactions, combines the data characteristics 22 of the data from the input slips A1j, etc. with the CPU characteristics 26 and arithmetic characteristics 27, and obtains the sum total $\Sigma$Aij of the data in each deposit slip Aij in the fastest and the most economical manner of arithmetic operations. Likewise, the master program 20 obtains the sum total $\Sigma$Bij of the data in each payment slip group Bij. The sum totals $\Sigma$Aii and $\Sigma$Bij are stored temporarily in the memory space 21 of working memory. At this point, the master program 20 establishes the block data characteristics 29 based on the block data of $\Sigma$Aii and $\Sigma$Bij, as in the case of the previously mentioned individual data characteristics 22.

Where the block data of $\Sigma$Aii and $\Sigma$Bij are to be stored into the database 31 (e.g., hard disk), the master program 20 compares the block data characteristics of the block data of $\Sigma$Aij and $\Sigma$Bij with the magnetic medium specifications 25, and stores the block data according to the block storage priority format 35. The master program 20 automatically edits the block data by referring to the current hard disk characteristics contained in the magnetic medium specifications 25 (i.e., hard disk capacity and other specifications), and stores the edited data in the priority pattern 1. If the operator designates the pattern 2 using the keyboard 4, the edited data may be stored in the pattern 2 instead of in the default pattern 1.

The operator then specifies calculations of the sum total ratio. This causes the master program 20 to retrieve the data of $\Sigma$Aii and $\Sigma$Bij from the memory space 21; combines the block data characteristics 29, CPU characteristics 26 and arithmetic characteristics 27; and obtains the ratio of $\Sigma$Aii/$\Sigma$Bij in the fastest and the most economical manner of operations. At this point, the master program 20 may also establish new block data characteristics 30 based on the block data of $\Sigma$Aij/$\Sigma$Bij. If the block data of $\Sigma$Aii/$\Sigma$Bij are to be stored into the database 31, the new block data characteristics 30 of the block data $\Sigma$Aij/$\Sigma$Bij are compared with the magnetic medium specifications 25 so that the data will be placed onto the hard disk according to the new disk storage priority format 36.

Below is a description of how the CRT 2 displays the data retrieved from the database 31 or from the memory space 21, i.e., data of the deposit slip Aij, data of the payment slip Bij, sum total block data of $\Sigma$Aij and $\Sigma$Bij, and ratio block data of $\Sigma$Aij/$\Sigma$Bij. The master program 20 automatically edits data contents by comparing the data of the deposit slip Aij with the data characteristics 22 and CRT specifications 23. The resulting data are displayed according to the CRT display priority format 32.

When ordinary slip data are to be displayed on the CRT 2, the master program 20 in the CPU 1 automatically edits and displays the display data by referring to the current characteristics contained in the CRT specifications 23 (e.g., display column count, size, resolution). The display patterns have predetermined priorities 1, 2, 3, etc. If no instructions come from the keyboard, the slip data are displayed in a manner of average on-screen distribution according to the predetermined pattern 1. If the operator designates the pattern 2 using the keyboard 4, the slip data may be displayed in the pattern 2 instead of in the default pattern 1.

Figure 27:
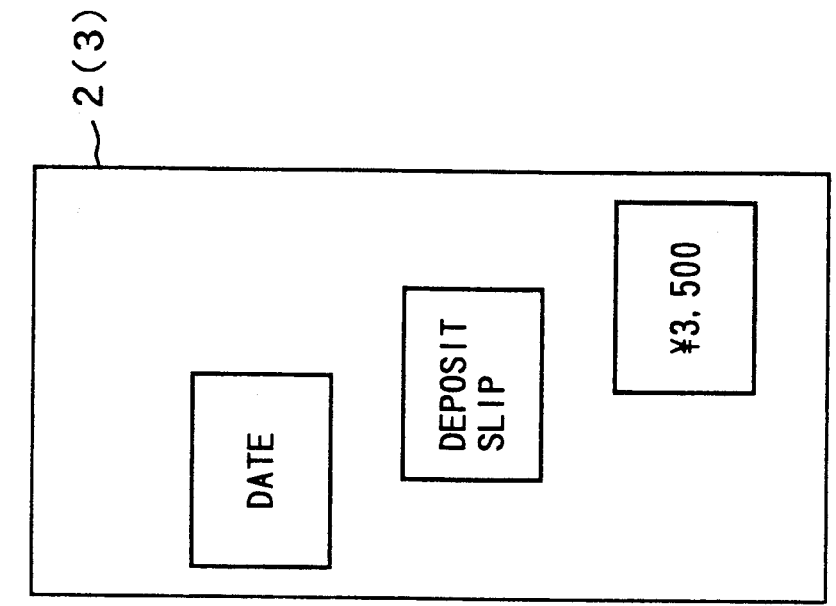
FIG. 27 is anther view indicating how a display or a printout may be made according to the invention.
Figure 26:
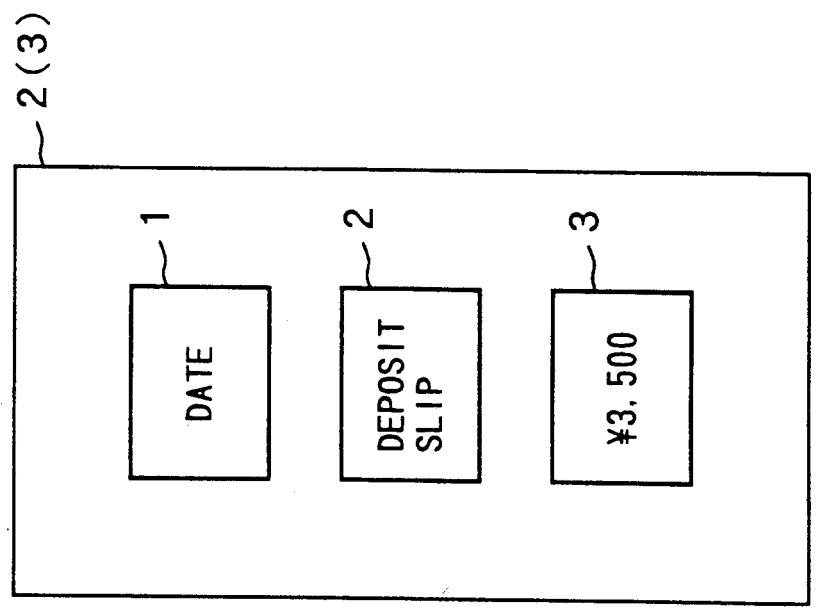
FIG. 26 is a view sketching how a display or a printout may be made according to the invention.

In FIG. 26, for example, the CRT 2 displays from top to bottom on its screen the applicable date (e.g., May 11, 1991), an account name (e.g., purchase slip), and an amount (e.g., Y3,500). If the operator designates the display pattern of, say, priority 2, the CRT 2 then displays these items from top left to bottom right of the screen, as depicted in FIG. 27. When the block data characteristics and the CRT specifications are referenced, the data of the payment slip Bij, the sum total block data of $\Sigma$Aij and $\Sigma$Bij, and the ratio block data of $\Sigma$Aij/$\Sigma$Bij are also displayed on the CRT 2 in the same display format as the data of the deposit slip Aij.

What follows is a description of how to print on the printer 3 the data read from the database 31 or from the memory space 21, i.e., data of the deposit slip Aij, data of the payment slip Bij, sum total block data of ΣAij and ΣBij, and ratio block data of ΣAij/ΣBij. The master program 20 automatically edits data contents by comparing the data of the deposit slip Aij with the data characteristics 22 and printer specifications 24. The resulting data are printed according to the printing priority format 33.

Specifically, when ordinary slip data are to be printed on the printer 3, the master program 20 in the CPU 1 automatically edits and prints the print data by referring to the current characteristics contained in the printer specifications 24 (e.g., print column count, paper size, character type). The print patterns have priorities 1, 2, 3, etc. If no instructions come from the keyboard, the data are printed in a manner of average on-paper distribution according to the predetermined pattern 1. If the operator designates the pattern 2 using the keyboard 4, the slip data may be printed in the pattern 2 instead of in the default pattern 1.

For example, as in the case of the CRT 2 shown in FIG. 26, the printer 3 prints from top to bottom on a sheet of paper the applicable date (e.g., May 11, 1991), an account name (e.g., purchase slip), and an amount (e.g., Y3,500). If the operator designates the print pattern of, say, priority 2, the printer 3 then prints these items from top left to bottom right, as depicted in FIG. 27. The data of the payment slip Bij, the sum total block data of ΣAij and ΣBij, and the ratio block data of ΣAij/ΣBij are also printed on the printer 3 in the same print format as the data of the deposit slip Aij. The same process applies to the sum of ΣAij and ΣBij (ΣAij + ΣBij), the difference therebetween (ΣAij − ΣBij), and the product thereof (ΣAij*ΣBij).

The procedure made of the selecting, combining and processing steps that have been entered at various previous stages to obtain the budget versus actual expenditure list is recognized as a new program. The newly recognized program is stored onto the hard disk 9. Thereafter, the program operates as a new resource that may be invoked whenever needed by anyone with little background knowledge of accounting or computing readily to create a budget versus actual expenditure list.

The budget versus actual expenditure list obtained as a result of the above-described execution is a summary table in the form of a spread sheet (work sheet) that exceeds in the memory space 21 the available display range of the CRT 2. As in the case of displaying the ratio of ΣAij/ΣBij, the master program 20 automatically edits the data of a user-requested data range by comparing the data characteristics 22 of the summary table with the CRT specifications 23. The summary table thus obtained is displayed according to the CRT display priority format 32. For printing of the budget versus actual expenditure list on the printer 3, the master program 20 automatically edits the user-required data range by referring to the data characteristics 22 of the summary table and the printer specifications 24 (e.g., display column count, paper size, character type). The result is printed in the same manner as the ratio data of ΣAij/ΣBij. Unless otherwise specified, the budget versus actual expenditure list is printed in a manner of average on-paper distribution according to the predetermined pattern 1. If the operator designates the pattern 2 using the keyboard 4, the data may be printed in the pattern 2 instead of in the pattern 1.

As described., the accounting personnel having specialized knowledge of accounting but with little aptitude in computer programming may readily create a new computer program to deal with new accounting jobs as they come about. All the computing novice has to do is to designate master files and basic programs needed for the kind of accounting processing according to the menu on the screen.

Figure 28:
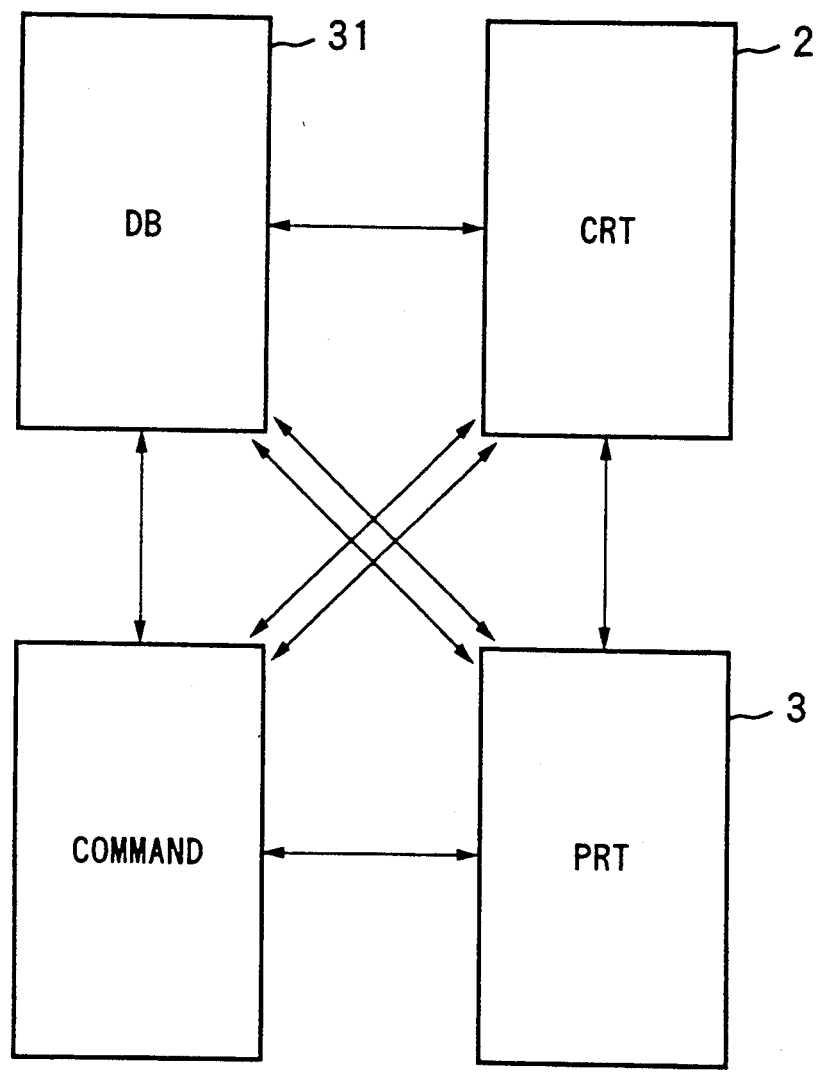
FIG. 28 is a view depicting how data cards are moved illustratively among modules according to the invention.

In FIG. 28, the CRT 2, the printer 3, the database db and the command module COM may be regarded as firmware modules. In that setup, the data card 56 moves freely between these modules at equal transfer priorities. When a data card 56 containing actual data arrives at the CRT 2, the data held therein are displayed on the screen free of the constraints of any other module and subject solely to the CRT specifications 23.

As described and according to the invention, data in the form of data cards are readily moved in and out of, and exchanged between, the command module, automatic editing display generator, printer generator and database. Programs may be written by simply selecting necessary commands in a small number of characters (of Japanese and other languages); the commands may be selected illustratively through kana-kanji conversion input. There is no need to type long sentences in alphabetic characters or in symbols, On arrival at the database db, the data card containing actual data is controlled solely by the data characteristics of the database for file storage and editing, free of the constraints of any other module. A group of files on the magnetic disk where data layouts are defined may be readily accessed by anyone with little knowledge of computer systems by use of an appropriate series of database commands. Furthermore, the data cards containing actual data may be processed individually and in parallel by each of the modules.

The invention thus permits anyone with little knowledge of computer systems easily to create and execute one program after another as needed. Because the commands function in the order in which they are arranged, the complexity associated with conventional loop control arrangements is significantly alleviated.

As many apparently different embodiments of this invention may be made without departing from the spirit and scope thereof, it is to be understood that the invention is not limited to the specific embodiments thereof except as defined in the appended claims.

What is claimed is

1. A method for creating programs and processing data by establishing a programming language using a data processing apparatus so that said programming language will represent the steps for executing an accounting theory system, said method comprising the steps of:

dividing and classifying by function a collection of accounting knowledge for executing accounting processing so that basic components of said accounting knowledge are extracted;

correlating unit programs and individual programming terms constituting said programing language with said basic components of said accounting knowledge to prepare a correspondence table;

creating an accounting execution procedure by putting together an appropriate number of said basic components of said accounting knowledge for obtaining desired results of accounting;

creating an execution program by selecting, from said correspondence table, those of said unit programs and of said individual programming terms corresponding to the basic components constituting said accounting executing procedure;

creating a processing program by combining the selected unit programs and individual programming terms with actual data representing accounting transactions;

creating a set of data cards by combining said actual data with a description of the attributes exhibited by said actual data in said programming language;

defining as execution information said basic components, said unit programs, said individual programming terms, said correspondence table, said accounting execution procedure, said execution program and said data cards;

recording said execution information in a reusable manner; and defining and assigning said execution in formation to a command module, to a display module, to a print module and to a database module;

wherein the assignment of any part of said execution information to said command module is made from the viewpoint of creating another execution program similar to said execution program; the assignment of any part of said execution information to said display module and to said print module is made from the viewpoint of displaying said execution information; and the assignment of any part of said execution information to said database module is made from the viewpoint of storing said execution information for later duplication and reference.

2. A method for creating programs and processing data according to claim 1, wherein each of said data cards comprises a system block; a header information block for storing data names and a destination module name; a record information block for storing item types, the number of items constituting each record and other record-related information; an item information block for storing item sizes, data attributes and the number of items constituting each record; and an actual data block for said actual data.

3. A method for creating programs and processing data according to claim 1, wherein said description of said attributes comprises item contents, data lengths, data locations, signal types for indicating a number representation system, and data types for indicating alphanumeric/kanji character distinction.

4. A computer implemented process for creating programs and processing data comprising the steps of:

listing master files and slips which are expected to be handled from an accounting point of view;

analyzing the contents of said master files and said slips to establish necessary items;

creating an item dictionary representing the characteristics of said items;

preparing various tables containing the numbers, scopes, functions and specifications of hardware and firmware resources, said hardware resources including a central processing unit, a display unit, a printer and a magnetic storage unit constituting a data processing apparatus, said firmware resources being made of accounting application programs;

storing said master files, said slips, said item dictionary and said various tables in said magnetic storage unit to build a database therein comprising said master files, said slips and other resources;

writing actual data into said master files and said slips;

inputting said master files and said slips containing said actual data into said database;

combining said master files and said slips containing said actual data with said accounting application programs for processing according to accounting principles in order to obtain significant data groups which are significant from an accounting point of view;

recognizing the procedure of said combining and of said processing as a new program; and performing, singly and collectively, the operations of displaying and printing the significant data and storing the significant data groups and said new program on said display unit in said magnetic storage unit.

* * * * *

UNITED STATES PATENT AND TRADEMARK OFFICE
CERTIFICATE OF CORRECTION

PATENT NO. : 5,317,504
DATED : May 31, 1994
INVENTOR(S) : Mamoru NAKAYAMA

PAGE 1 OF 2

It is certified that error appears in the above-indentified patent and that said Letters Patent is hereby corrected as shown below:

Col. 1, line 13, "AT" should read --AI--.

Col. 2, line 15, "Tn" should read --In--; and line 28, delete "Aspect" insert --aspect--.

Col. 4, line 50, delete "cheek" insert --check--.

Col. 7, line 19, delete "tip" insert --up--; and line 44, delete "TD" insert --ID--.

Col. 8, line 4, "Aii" should read --Aij--;

line 5, "Cii" should read --Cij--;

line 41, "Y" should read --¥--; and line 44, "A1i" should read --A1j--.

Col. 10, line 55, delete "Lip" insert --up--.

Col. 12, line 64, delete "pro&,rams" and insert --programs--.

Col. 14, line 26, delete "lip" insert --up--.

Col. 15, line 30, delete "oat" insert out--.

UNITED STATES PATENT AND TRADEMARK OFFICE
CERTIFICATE OF CORRECTION

PATENT NO. : 5,317,504
DATED : May 31, 1994
INVENTOR(S) : Mamoru NAKAYAMA

It is certified that error appears in the above-indentified patent and that said Letters Patent is hereby corrected as shown below:

Col. 16, line 1, "Aii" should read --Aij--;

line 5, "Aii" should read --Aij--;

line 7, "Aii" should read --Aij--;

line 23, "Aii" should read --Aij--;

line 26, "Aii" should read --Aij--;

line 30, "Aii" should read --Aij--; and line 62, "y" should read --¥--.

Col. 17, line 29, "y" should read --¥--.

Col. 19, line 21, "in formation" should read --information--.

Signed and Sealed this

Fourth Day of April, 1995

BRUCE LEHMAN

Attest:

Attesting Officer

Commissioner of Patents and Trademarks